(12) United States Patent
Denholm et al.

(10) Patent No.: US 10,668,971 B2
(45) Date of Patent: Jun. 2, 2020

(54) BICYCLE SAFETY APPARATUS AND METHODS

(71) Applicant: Timothy Denholm, Salisbury (GB)

(72) Inventors: Timothy Denholm, Salisbury (GB); Timothy Milne, Salisbury (GB)

(*) Notice: Subject to any disclaimer, the term of this patent is extended or adjusted under 35 U.S.C. 154(b) by 106 days.

(21) Appl. No.: 15/901,752

(22) Filed: Feb. 21, 2018

(65) Prior Publication Data

US 2019/0256162 A1   Aug. 22, 2019

(51) Int. Cl.
| | |
|---|---|
| *B62J 99/00* | (2020.01) |
| *G06K 9/00* | (2006.01) |
| *H04N 7/18* | (2006.01) |
| *H04N 5/232* | (2006.01) |
| *H04N 5/77* | (2006.01) |
| *B62J 1/28* | (2006.01) |
| *H04W 12/06* | (2009.01) |
| *B62J 6/04* | (2020.01) |
| *B60Q 9/00* | (2006.01) |
| *G08G 1/017* | (2006.01) |

(52) U.S. Cl.
CPC .............. *B62J 99/00* (2013.01); *B60Q 9/008* (2013.01); *B62J 1/28* (2013.01); *B62J 6/04* (2013.01); *G06K 9/00791* (2013.01); *G08G 1/0175* (2013.01); *H04N 5/23245* (2013.01); *H04N 5/77* (2013.01); *H04N 7/183* (2013.01); *H04W 12/06* (2013.01); *B62J 2099/002* (2013.01); *B62J 2099/004* (2013.01); *B62J 2099/0013* (2013.01); *B62J 2099/0033* (2013.01); *G06K 9/00805* (2013.01)

(58) Field of Classification Search
CPC ...... B60Q 9/008; B60Q 1/525; B60Q 1/0023; B60Q 1/50; B62J 2099/002; B62J 2099/004; B62J 27/00; G08G 1/166; G08G 1/167; G08G 1/0175; G08G 1/163; G01S 2013/9378; G01S 2013/9332; G01S 13/58; B60R 2300/802; B60R 2300/8033; B60R 2300/8066; G06K 9/00791
See application file for complete search history.

(56) References Cited

U.S. PATENT DOCUMENTS

| | | | | |
|---|---|---|---|---|
| 6,731,202 B1 * | 5/2004 | Klaus | ..................... | B60Q 1/525 340/425.5 |
| 8,638,237 B2 * | 1/2014 | Robaz | ..................... | G08G 1/163 340/432 |
| 9,592,874 B2 * | 3/2017 | Hsu | .......................... | B62J 99/00 |
| 10,071,748 B2 * | 9/2018 | Gupta | ..................... | B60K 35/00 |
| 10,096,224 B1 * | 10/2018 | Kegley | .................. | G08B 21/22 |

(Continued)

FOREIGN PATENT DOCUMENTS

| | | | | | |
|---|---|---|---|---|---|
| GB | 2431033 | A | * | 4/2007 | |
| GB | 2555697 | A | * | 5/2018 | ........... G07C 5/0866 |

(Continued)

*Primary Examiner* — John Villecco

(57) ABSTRACT

The bicycle safety device preferably measures both the traverse proximity to the bike frame and speed of an overtaking vehicle and calculates a driving safety assessment based on a predetermined safety threshold. This assessment, along with the video evidence, is uploaded to a remote server. The device may have a very distinctive light display/effect (which may double as a rear bike light) so that drivers will recognize the device and respond by only overtaking when they are able to do so safely.

15 Claims, 7 Drawing Sheets

(56) References Cited

U.S. PATENT DOCUMENTS

| | | | | |
|---|---|---|---|---|
| 10,112,669 B1* | 10/2018 | McGeever | | B62J 11/00 |
| 10,124,847 B2* | 11/2018 | Pearce | | B60Q 1/0023 |
| 10,144,474 B2* | 12/2018 | Rajamani | | B62J 27/00 |
| 10,332,374 B2* | 6/2019 | Kegley | | G08B 21/22 |
| 10,377,308 B2* | 8/2019 | Savaresi | | B60Q 9/008 |
| 10,393,872 B2* | 8/2019 | Brisimitzakis | | G01S 7/003 |
| 2007/0067079 A1* | 3/2007 | Kosugi | | G07C 5/085 |
| | | | | 701/32.4 |
| 2007/0219686 A1* | 9/2007 | Plante | | G07C 5/008 |
| | | | | 701/33.4 |
| 2009/0033475 A1* | 2/2009 | Zuziak | | B62J 3/00 |
| | | | | 340/432 |
| 2010/0020169 A1* | 1/2010 | Jang | | G01C 21/36 |
| | | | | 348/115 |
| 2011/0057783 A1* | 3/2011 | Yagi | | B60R 1/00 |
| | | | | 340/436 |
| 2013/0311075 A1* | 11/2013 | Tran | | B60W 30/09 |
| | | | | 701/117 |
| 2015/0228066 A1* | 8/2015 | Farb | | G06K 9/00805 |
| | | | | 348/148 |
| 2015/0286875 A1* | 10/2015 | Land | | H04N 19/46 |
| | | | | 382/103 |
| 2015/0332563 A1* | 11/2015 | Davis | | G08B 5/006 |
| | | | | 342/66 |
| 2016/0014377 A1* | 1/2016 | Fiegert | | F16M 13/02 |
| | | | | 348/148 |
| 2016/0090037 A1* | 3/2016 | Tetsuka | | B60Q 9/008 |
| | | | | 340/435 |
| 2016/0363665 A1* | 12/2016 | Carlson | | G01S 13/931 |
| 2017/0160392 A1* | 6/2017 | Brisimitzakis | | G01S 13/931 |
| 2017/0263107 A1* | 9/2017 | Doyle | | G08B 25/016 |
| 2018/0154894 A1* | 6/2018 | Norwood | | B60W 30/143 |
| 2018/0361919 A1* | 12/2018 | Sorokin | | B60Q 1/525 |
| 2019/0051184 A1* | 2/2019 | Lahav | | G01S 13/931 |
| 2019/0172354 A1* | 6/2019 | Hoffmann | | B60W 30/08 |
| 2019/0210681 A1* | 7/2019 | Shin | | B60Q 1/26 |

FOREIGN PATENT DOCUMENTS

| | | | | |
|---|---|---|---|---|
| JP | 2015005165 A | * | 1/2015 | |
| WO | WO-2012080799 A1 | * | 6/2012 | G01S 13/931 |
| WO | WO-2015147346 A1 | * | 10/2015 | H04W 4/023 |

* cited by examiner

BICYCLE SAFETY APPARATUS AND METHODS

The present invention relates to apparatus and methods for encouraging a driver of an approaching vehicle to pass a cyclist or moped user only at a safe distance. The invention is applicable to the field of safety devices for bicycles and mopeds.

BACKGROUND

In the past, common approaches for discouraging drivers from overtaking cyclists in an unsafe manner have included wearing or carrying various visibility aids such as yellow jackets and lights, the technique of cycling in the middle of a lane when it would be unsafe for motorists to overtake, and also a device known as a "lollipop" "safety flag" or "flash flag", which is a yellow or orange piece of flexible plastic warning sign arranged to stick out (via a pivoting and typically spring-mounted bracket) from near the rear axle of the bicycle, which encourages drivers to leave more space when overtaking the cyclist.

The various visibility aids are effective only by way of ensuring the driver has noticed the cyclist and thus are unreliable. A small proportion of drivers still do not consistently give cyclists enough space that they can reliably negotiate potholes and balance safely, potentially causing an accident that could injure and/or kill the cyclist.

The "lollipop" device is, to date, the best attempt to address this problem. However, despite this it remains extremely unpopular among cyclists. This is believed to be because cyclists generally wish to be seen as athletic individuals and/or enthusiasts, rather than as scared individuals and/or victims. The lollipop in particular tends to be associated less with athletes than for example with learner cyclists, children, and the frail and elderly. As a result there seems little prospect of it ever becoming a popular cycling accessory.

The continued risk that cyclists face due to dangerous overtaking by drivers, as well as the anxiety this causes to cyclists, contributes to the ongoing popularity of cars over bicycles. In turn this contributes to increased road congestion, exhaust fumes, noise pollution, and use of fossil fuels.

Providing a solution to this problem would reduce accidents, and consequently encourage more people to cycle, promoting greater levels of exercise among the general population and help mitigate against well-recognised public health issues such as obesity. Furthermore, an increase in cyclists would help reduce car usage and therefore promote a greener world.

OBJECT OF THE PRESENT INVENTION

It is therefore an object of the present invention to provide a device for, or method of, encouraging a driver of an approaching vehicle to pass a cyclist only at a safe distance.

According to a first aspect of the present invention there is provided a device for encouraging safer driving, comprising:
  an image data recorder, arranged to record image data;
  a vehicle proximity detector, arranged to record vehicle proximity data;
  a computer processor;
  a data storage device; and
  a data transmission module arranged to transmit to a remote server;
  wherein the computer processor is configured to:

identify, at least partly from the vehicle proximity data, vehicle overtaking events in which a predetermined vehicle overtaking manoeuvre criterion is met;
  record image data from the image data recorder to the data storage device;
  identify first periods of time during which a predetermined overtaking manoeuvre criterion is met, and second periods of time in which the predetermined overtaking manoeuvre criterion is not met;
  control the data transmission module to selectively transmit image data relating to at least the first periods of time, such that:
    in the image data transmitted, a pixel rate of the image data with respect to a time recorded has:
      at least a first predetermined value for the first periods of time, but;
      a lower or zero value for the second periods of time.

By providing such devices on vehicles particularly bicycles, and by presenting the data received at the remote server to insurance companies (and/or law enforcement agencies and/or the public via a website), drivers are motivated to drive safely. Moreover, if the device is provided with a visual indication of its nature (i.e. being distinctive in design, and its functionality having been widely advertised) this provides a particularly strong incentive for drivers in the vicinity of the device (rather than an incentive to drivers in general) to avoid dangerous overtaking manoeuvres.

Recording image data from the image data recorder to the data storage device is either done in response to the vehicle overtaking manoeuvre criterion being met or is done substantially continuously.

Generally, the device is for mounting on a bicycle, and is for monitoring other vehicles. Thus the term 'vehicle' refers to vehicles that are remote from the device and that are remote from the vehicle (e.g. bicycle) that the device is mounted on, as opposed to monitoring the vehicle that the vehicle (generally, bicycle) that the device is mounted on. However of course it may additionally monitor the vehicle it is mounted on, particularly its speed.

While the invention is predominantly described with reference to use by cyclists and mounted on bicycles it may have utility with some other vehicles, especially mopeds. Optionally the device is for a bicycle or indeed is mounted on a bicycle. Optionally the device is for a bicycle or moped, or indeed is mounted on a bicycle or moped.

The term 'server' includes cloud based services distributed among many physical servers, and in an extreme case also peer-to-peer cloud services where the computer processor cooperates with other computers to store multiple copies of files for retrieval. A common element of all these types of server is that they provide a service for data to be uploaded and reliably managed for later retrieval (whether in exactly the same form or not).

The term 'first periods of time during which a predetermined overtaking manoeuvre criterion is met' includes as one option that the period of time is identified in which the overtaking manoeuvre criterion is met substantially throughout that period of time. As another option for example where the overtaking manoeuvre criterion is met such a first period of time may include an interval of time before and/or afterwards, which may be a predetermined amount of time (e.g. 5 seconds) or may be determined by an equation, look up table or like means based on other factors. This would be to include the events immediately preceding and following the overtaking event.

The term 'pixel rate' relates to the number of pixels multiplied by the frame rate divided by the time the pixels are recorded over. Therefore if 1 megapixel images are recorded at 25 frames per second the pixel rate is 25 million pixels per second. In typical embodiments the resolution is not varied and thus it is typically the frame rate that is different between the data uploaded of first and second periods of time. The pixel (and indeed frame) rate refers to the period of time recorded, not the period of time uploaded.

One option is to monitor the proximity data and to initiate recording of image data only when proximity is detected. This has the advantage of saving battery power, processor capacity and/or data storage space. Another option is to record image data continuously and to selectively transmit the data associated with vehicles coming in close proximity. This has the advantage of enabling the device to capture and transmit events shortly preceding the moment when a vehicle came dangerously close.

According to a second aspect of the invention, there is provided a device for encouraging safer driving, comprising:
an image data recorder, arranged to record image data;
a vehicle proximity detector, arranged to generate vehicle proximity data;
a computer processor;
a data storage device; and
a data transmission module arranged to transmit to a remote server;
wherein the computer processor is configured to identify from the vehicle proximity data and/or image data, vehicle overtaking events which satisfy a predetermined overtaking manoeuvre criterion, and to identify portions of the image data recorded at the time of such overtaking events, and to control the data transmission module to selectively transmit those portions of the image data to the remote server.

The term 'selectively' means that the device acts to avoid uploading video data from a whole journey or at least does not do so at a high frame, thus conserving the bandwidth of the user's broadband subscription while still uploading the most relevant data. The most straightforward approach would be to only upload those overtaking events that met the overtaking manoeuvre criterion (E.g. came closer than a certain distance, such as less than 100 cm for example).

More generally according to a third aspect of the present invention there is provided a device for encouraging safer driving, comprising:
an image data recorder, arranged to record image data;
a vehicle proximity detector, arranged to generate vehicle proximity data;
a computer processor;
a data storage device; and
a data transmission module arranged to transmit to a remote server.

Devices and methods of any of the aspects may be advantageously used in conjunction with any combination of features described herein.

Proximity Detector and Overtaking Assessment

A preferred approach is that the vehicle proximity detector is a proximity measurement sensor, preferably an echo or reflection based distance sensor, and is arranged to provide a measurement beam extending outwardly from the device to measure the position of a vehicle passing into the beam.

Although there are many options for how to detect vehicle proximity, it is necessary to detect when a vehicle has overtaken, in order that the image data from the overtaking event can be identified for being uploaded, without needing to upload image data from the whole cycling trip. Not only does this overcome the problem that large volumes of data would need to be uploaded, but also it allows the data to be compartmentalised into data relating to each overtaking event. Each compartmentalised section of data can then be analysed (E.g. at the server end) to determine the registration number of the vehicle in order to build up a database of vehicles associated with unsafe overtaking events.

The vehicle proximity detector could for example be:
an audio sensor (possibly filtered to preferentially be sensitive to the noise of tyres on tarmac, and passed through an algorithm to detect gradual increase and decrease of such noises—it may even utilise a stereo microphone to estimate the direction of passing of the vehicle),
a computer processor (e.g. the same as the aforementioned one) controlled to detect a passing vehicle from the image data (note that if only a single video camera is used it is still possible to measure distances by detecting a vehicle, estimating its size, and using the size to determine its distance, or even by using standard street furniture to accurately calibrate the camera orientation and thus determine the distance of a vehicle by the position of one of its wheels), or
an active reflection detection based distance sensor (e.g. ultrasonic or infra-red)

By providing an assessment of overtaking (overtaking distance, or preferably a combined assessment based on overtaking distance and overtaking speed), fewer segments of image/video data need to be uploaded, reducing the transmission requirements (and typically the burden on the user's broadband plan) and further alleviating the requirement to then analyse each overtaking event at the server end based on the image/video data (which would be computational intensive).

The most straightforward approach would be to only upload those overtaking events that met the overtaking manoeuvre criterion (E.g. came closer than a certain distance, or satisfied a formula involving both distance and speed), however other valid approaches are possible, such as always uploading at least the closest 10 overtaking events.

Generally, the vehicle proximity data is sent along with any portion of image data, however in the cases that the proximity data was generated by computer analysis of a camera (e.g. either using a stereoscopic camera, or just based on position of the bottom of a vehicle wheel within the field of view), then it is adequate to just send the image data because the vehicle proximity analysis could be repeated at the server end. Typically the time and date (if possible) and any location or route data is provided too.

Optionally the proximity detector is provided by the image data recorder and the computer processor where the computer processor is adapted to determine proximity from the image data, however preferably the proximity detector is a separate element from the image data recorder, e.g. an infrared or ultrasonic detector.

Generally the data transmission module is arranged to transmit the image data to the remote server only in relation to cases where the vehicle proximity data (or data derived therefrom) corresponded to less than a threshold distance. This has the effect of reducing the amount of data to be transmitted.

Typically the device is configured to: preferentially store in the data storage device any image data in relation to cases where the vehicle proximity data (or data derived therefrom) was less than a threshold, and to delete or overwrite from the data storage device any other image data from the image data recorder. This has the effect of reducing the amount of data storage required.

Optionally the vehicle proximity detector comprises an ultrasonic sensor. This has the advantage of offering a long range (typically up to 4 m), however typical ultrasonic sensors only operate 10 times a second, and have a risk of interference with each other, or with sensors on other bicycles. These problems can be reduced by alternating the sensors (if there is more than one) and/or varying the timing of firing randomly.

Alternatively (or in addition) the vehicle proximity detector comprises an infra-red sensor. This has the advantage of operating more frequently than a typical ultrasonic sensor, although it may limit the range to about 1-1.5 m. It is also believed that infra-red sensors are less prone to interference than ultrasonic sensors because they include a lens to focus the beam more tightly.

Generally the device is adapted to determine both the distance of an overtaking vehicle, and its direction relative to the device. Or more generally it determines both distance in a first direction, and relative motion in a second direction perpendicular to the first direction. The two main ways to determine the relative motion are the use of two spaced proximity sensors, and the use of video based movement detection using the data from the camera. The detection of the relative motion is important even if the device does not measure the speed of the overtaking vehicle because it allows the device to discriminate between overtaking objects and objects being overtaken/passed. Merely using distance measurement will cause an excess of false detections as the objects being passed. This is because pedestrians and parked cars, will be detected in close proximity far more often than dangerously driven overtaking vehicles.

According to one embodiment the vehicle overtaking speed detector comprises a camera arranged such that in use, is arranged to generate vehicle overtaking speed data by identifying the relative speed of motion in one or parts of the field of view. This can be done using optical flow or by detection of shapes such as edges or circles/ovals (i.e. vehicle wheels) and their relative motion in successive frames.

Especially if the camera has a wide field of view, the video based motion measurement preferably is limited to a portion of the field of view which in use corresponds to the closest approach of the overtaking vehicle, i.e. the direction perpendicular to the motion of the vulnerable road user/cyclist. It is also possible to track the apparent motion of the overtaking vehicle as it approaches and/or goes beyond that direction, and to use the speed of that motion taking into account the geometry of the camera/lens, in particular the fish-eye effect/parameter of the camera lens. Thus the motion of the vehicle can be taken into account over a longer period of time than just the frames corresponding to the overtake event itself. Optionally the relative acceleration/deceleration of the overtaking vehicle can also be measured using this approach, which may be beneficial in assessing whether the overtaking event was dangerous.

As an alternative to edge/circle detection, the known software technique of 'optical flow' may be implemented to measure relative speed in the whole or a portion of the field of view. In this approach the background will generally be seen to move in one direction from the camera's perspective (on UK roads, moving to the right of the field of view, in most countries to the left), and during an overtake most or all of the field of view will show the vehicle, which will appear to be moving in the opposite direction. By applying a software filter to record the speed of motion of the relevant area during such events, the relative speed of the overtaking vehicle can be calculated.

In these examples the distance of the overtaking vehicle is used, along with information on the geometry of the camera (e.g. it's angular field of view, or a measure of the angle between each column of pixels for example), to calculate the actual relative speed of the overtaking vehicle at the time of the overtake.

In addition it is possible to use the same approach to estimate the relative speed of the overtaking vehicle shortly before the time of the overtake, and/or depending on the field of view of the camera possibly shortly after the time of the overtake. Although measurement accuracy would normally be lower when the vehicle is further from the camera, this enables detection and ideally measurement of acceleration or deceleration, and this can be taken into account when assessing whether the overtake was dangerous (e.g. in the case of strong deceleration, if the speed and distance are otherwise borderline, this may be used to evaluate the event as dangerous).

Assessment of Whether the Overtake Constituted Dangerous Driving and Grading It.

Preferably an automatic overtaking dangerousness assessment is performed based on a measure of the overtaking speed of the overtaking vehicle, and on the distance of the overtaking vehicle. In particular the measure of the overtaking speed preferably comprises the absolute velocity of the vehicle rather than the relative velocity. This typically requires combining the relative overtaking velocity with the absolute velocity of the apparatus itself (which is carried by the vulnerable user being overtaken).

Once the relative velocity of the overtaking vehicle is known, the absolute velocity of the overtaking vehicle can be calculated by adding it to the absolute speed of the apparatus (E.g. upon a bicycle).

The absolute speed of the apparatus can be determined by means of a GNSS receiver, or by measuring the wheel speed of a bicycle carrying the apparatus, or by a combination of GNSS receiver and an accelerometer (the two measurements being combined to provide real time forward velocity, since GNSS can typically only providing time-averaged velocity), or by a combination of GNSS receiver and measuring the wheel speed of a bicycle carrying the apparatus, or by any other means.

In addition to the absolute speed of the overtaking vehicle, it is preferable to also take into account the absolute speed of the apparatus, which can be determined in the same ways outlined above.

Suitable formulas for grading the dangerousness of an overtaking vehicle include:

$$\text{Grade} = 3 \times \text{Relative Speed (mph)} - \text{Distance (cm)} + 30 \text{ cm}$$

Here a sum greater than zero indicates dangerous driving, since at a negligible overtaking speed any distance less than 30 cm leads to a positive sum.

This can be conveniently rewritten as:

$$\text{Grade} = \text{Relative Speed (mph)} - \text{Distance (cm)}/3 + 10$$

One problem with this is that if a cyclist is travelling at 30 mph down a hill, and a car overtakes at 31 mph then this suggests it might be acceptable for the driver to come really close, which isn't true.

So a better formula would be: Grade=Vehicle Speed (mph)−Distance (cm)/3+10

This formula is an improvement, but still has a weakness. If both the cyclist and driver are moving at low speed (say, 1 mph and 10 mph) then it suggests that it is acceptable to overtake just as closely as if the speeds were, say 9 mph and 10 mph. In reality, it should make a significant difference whether the cyclist is stationary or moving.

A formula that handles these subtleties better is:

$$\text{Grade} = \text{Bike Speed (mph)} + \text{Vehicle Speed (mph)} - \text{Distance (cm)}/3 + 10 \qquad (5)$$

A final consideration is that in a particular country, such as the UK, anything further than, say, 150 cm would be considered acceptable, whilst clearly anything less than 30 cm from a bicycle frame is clearly likely to constitute an impact with the cyclist. It is therefore desirable to introduce matching limits to the grading formula however this causes discontinuities in the grading outcomes, with the result that any error in the sensor data could throw the grade from <0 (acceptable) to 30+ (Extremely Dangerous), or vice versa.

To address this, a further variation may be used to sculpt the grading outcomes to avoid any sharp cut-offs. An example is shown below.

$$\text{Grade} = \text{Bike Speed (mph)} + \text{Vehicle Speed (mph)} - \text{Distance}/3 + (1000/\text{Distance}) - (1000/(180 - \text{Distance}))$$

Similar considerations apply if the desired units are different, such as km/h rather than mph, or meters or feet.

Therefore preferably the dangerousness score is calculated by deducting a measure of overtaking distance from a measure of vehicle speed with a score above a threshold indicating dangerous driving, and a score below the threshold indicating the overtake did not constitute dangerous driving (or any equivalent formula rearrangement).

Furthermore the measure of vehicle speed preferably is based at least in part on the absolute speed on the overtaking vehicle, but more preferably on the sum of the absolute vehicle speed and the absolute apparatus speed. And the formula preferably includes at least one sculpting term to avoid discontinuities in scoring outcomes at physical minimum and/or legal maximum overtaking distances of interest.

Overtaking Speed Detector

Preferably the device comprises a vehicle overtaking speed detector, arranged to generate vehicle overtaking speed data; and the data transmission module is arranged to transmit to the remote server the vehicle overtaking speed data, or vehicle overtaking data derived therefrom. This has the effect of providing an improved measure of overtaking safety which avoids the effect on drivers being such that they may conclude that they can overtake at an unsafe speed as long as they overtake further than a predetermined distance.

Typically the vehicle proximity detector and the overtaking speed measurement device are provided by a pair of proximity sensors arranged to provide two measurement beams and to measure the distance and timing of vehicles passing through the two measurement beams, and the computer processor is arranged to calculate the speed of an overtaking vehicle by identifying two beam cutting events and determining the time between them and the distance that the vehicle moved between the two beam cutting events occurring.

Preferably the computer processor is arranged to:
process the vehicle proximity data, or data derived therefrom, and the vehicle overtaking speed data, or data derived therefrom, to:
  identify vehicle overtaking manoeuvres, and
  for each vehicle overtaking event,
    generate an assessment of the safety of that vehicle overtaking manoeuvre, and;
    determine whether the safety of that vehicle overtaking manoeuvre was below a threshold safety level;
    identify image data from the image data recorder, that is relevant to each vehicle overtaking manoeuvre for which the safety thereof was below the threshold; and
the data transmission module is arranged to transmit, for at least those manoeuvres for which the safety assessment was below the threshold:
  the vehicle overtaking manoeuvre safety assessment; and
  the image data relevant to that overtaking manoeuvre.

This has the effect that due to this initial safety assessment, potentially less data needs to be uploaded. It is also possible for additional computerised analysis to be performed on the data transmitted to the remote server by applying an overtaking assessment algorithm in a computer processor. For example this may further refine the overtaking safety assessment and/or may reject any data that does not correspond to a vehicle overtaking manoeuvre.

Preferably the computer processor is arranged to compress the image data associated with overtaking events Typically an additional computerised analysis may be performed on the data transmitted to the remote server which comprises identifying and extracting vehicle number plate registration numbers. This greatly facilitates providing the data to insurance companies (and/or law enforcement agencies and/or the public via a website) to ensure that there is a consequence for unsafe overtaking (E.g. so that unsafe overtaking carries a risk of an increase in a driver's insurance premium).

Light

Typically the device comprises a light, and the light provides a distinctive signal to drivers to provide a warning to the drivers that the device has the aforementioned features. This greatly increases the likely effect on drivers.

Thus, instead of merely being aware (e.g. by means of advertising or news reporting) that some bicycles now have devices that record unsafe overtaking and upload the data (e.g. for use by insurance companies), it is instead the case that the driver can more readily identify that a particular bicycle is fitted with such a device, thus strongly motivating the driver to overtake in a safe manner. It would be typical to provide the device with some kind of distinctive appearance to enable it to be identified by drivers.

Generally the light is in the form of at least one light emitting diode for providing a bicycle light. This has the advantage that the distinctive effect is generally visible to drivers approaching the bicycle well in advance. Especially in the case that it is a rear light, such drivers can plan their overtaking manoeuvres with ample forewarning that they need to drive safely.

Brightness Control

Optionally the computer processor is arranged to determine an ambient brightness, and to control in response thereto a brightness of the light, such that in a lower ambient light level, the light has a lower brightness, and in a higher ambient light level the light has a higher brightness. This has the advantage of overcoming common shortcomings of bicycle lights, firstly that they are typically either too dim for daytime use or too bright for night-time use, or that a user needs to adjust the brightness to suit the ambient brightness (and this is generally not practical when the cyclist sets off before sunset and arrives at his or her destination after sunset).

Where the device comprises a directional light (e.g. the distinctive rear light, or a front headlamp), the computer processor may be arranged to determine an ambient brightness in a first direction and to control in response thereto a brightness of a light directed in a second direction.

This has the advantage of overcoming the problem that sometimes (e.g. when rounding a corner perhaps), a cyclist may suddenly find that the sun is setting in front of them, or perhaps that a car approaching from in front has their full beams on. This situation makes it difficult for drivers to see the cyclist if they are approaching from the opposite direction (in this case, from behind).

To do this, the device may use its image data recorder (E.g. video camera) or a light level sensor (e.g. photodiode) to determine the ambient brightness in a forward and/or rear direction, and adjusts a light (rear or front light) that is directed in the opposite direction in tandem. So in the case of the sun being low in the sky directly ahead, the rear light would be controlled to have an increased brightness (as bright as possible in this situation). The same can be applied to the front light (if any) using a rear image recorder or light level sensor.

Bracket

Generally the device comprises a bracket for connection to a bicycle saddle. Typically the bracket is arranged to lock onto both of a pair of standardised seat-post-connection bars of a bicycle saddle undercarriage, such that the connection between the bracket and the seat-post-connection bars governs the orientation of the device relative to the saddle.

This has the advantage that, because a bicycle saddle is generally very well aligned with the bike frame, the image recorder (and any other sensors) will also have a fixed orientation relative to the bicycle, with the result that the image recorder and any other sensors can be configured so that they will point in appropriate, consistent, directions relative to the bicycle, which enables more accurate detection of overtaking vehicle distance (and speed if measured) and ensures that the image recorder can be arranged so that it will collect image data including the front of the overtaking vehicle and the overtaking event as a whole. Furthermore if additional algorithms are applied to the data received at the remote server (such as to verify the overtaking proximity/assessment from image/video data) this will be made easier because the image recorders (i.e. video cameras) will all be pointing substantially the same direction relative to the bicycle frames (and road surface).

Helpfully, the bracket may have a press-release connection to a device housing, such that upon the press-release connection being pressed, the device housing can be removed from the bracket and from the bicycle. This has the advantage of ensuring that the device can be easily removed either for charging a battery of the device, or to avoid it being stolen when the bicycle is left outside unattended. Optionally the press release connection includes a data connection such that when the housing is fitted to the press-release connection the data connection is connected. This enables connection of a separate second camera or other devices arranged elsewhere on the bicycle (magnetic speed sensor or front light etc).

Mobile Phone

Optionally the device comprises a mobile phone. This has the advantage that the functionality of the mobile phone, in particular the computer processor, the camera and the wifi module may be utilised, thereby reducing the cost of the device to users who already have a mobile phone. A typical mobile phone implementation would include a waterproof housing for the mobile phone, a bracket to hold the housing to a bicycle, optionally an extra battery to supplement the mobile phone's battery, and typically at least one additional sensor, such as an infra-red or ultrasonic sensor, and one or more data interface connections to connect the mobile phone to (possibly several different ones to suit different brands of mobile phone). In addition, the mobile phone implementation described above would require a computer program (generally in the form of an app made available from an app store) to control the mobile phone to collect image data and to determine vehicle proximity (E.g. using the sensor data) and to transmit it to the remote server. Typically even a mobile phone implementation would wait for wifi access before transmitting the data because sending large amounts of image/video data on a mobile phone network would be prohibitively expensive to the user.

The term mobile phone encompasses portable mobile devices which enable calls to be made, including VOIP (voice over IP) calls, and including wearable device such as telephony enabled glasses.

Bicycle Speed Sensor

Preferably the device is further provided with a bicycle speed sensor adapted to determine either the speed of a bicycle on which the device is mounted, or the radial speed of a wheel thereof, and to generate bicycle speed data therefrom; and the device is arranged either:

to transmit such bicycle speed data to the remote server to enable the server to calculate the absolute speed of overtaking vehicles; or to calculate the absolute speed of overtaking vehicles by deducting the bicycle speed from the relative overtaking velocity of the vehicles.

This has the advantage of providing for an improved assessment of overtaking safety (whether that assessment is carried out on the device or on the data received at the remote server), and as the motivation of the drivers to drive safely is related to how the safety is assessed, this would (via information becoming available to drivers via press releases or news reports or word-of-mouth) provide an improved motivating effect on drivers to overtake safely.

Second Image Data Recorder

Preferably the device further comprises a second image data recorder. This can be positioned in the housing along with the main image data recorder. The two devices (e.g. video cameras) can point in the same direction or substantially the same direction. This would aid an algorithm operating on the server data to verify the distance and speed of the overtaking vehicles. Alternatively the second image data recorder can be in a different direction (e.g. the main one can point backwards relative to the housing/bicycle, and the second one can point forwards or to the side). The second image data recorder can be arranged separately (typically via a cable) for positioning on a different part of the bicycles. For example the housing with the main image recorder can be at the rear of the bicycle (e.g. under the saddle) and the second image recorder can be on the handlebars facing forward.

Headlamp

Preferably the device comprises a white light for providing a bicycle with a front headlamp. This has the advantage that, along with a rear light, one device can provide the necessary lighting for safe cycling. Preferably the white light is powered by the same battery as the other components.

Wireless Data Module

Typically the device comprises a wireless data transmission module, and the device is configured to authenticate with a wireless router in the event that the device is brought within wireless transmission range thereof, and to transmit the aforementioned data to the remote server via the wireless router, and upon completion of the transmission to either delete such data or mark it as transmitted. This is useful to ensure that data is not uploaded twice. An alternative would be to provide a USB or Ethernet port for a user to attach a cable to provide an internet connection.

Preferably the device is configured such that if it is brought into wireless transmission range with a wireless router with which it has previously authenticated, it will automatically authenticate without requiring user intervention and automatically transmit such aforementioned data to the remote server. This has the advantage that, after initial setup (inputting a wifi SSID and password for example) the device will operate automatically, thus increasing the likelihood that an unsafe overtaking manoeuvre will be not only recorded and identified but also uploaded to the server.

Preferably the device comprises a wireless module. This has the advantage that the user does not need to connect the device via a cable to an internet connected computer or router. This means that the device can be charged anywhere in the user's home while still typically being within range of the user's wifi router, so it is often unnecessary for the user to take any particular action to ensure that the data is uploaded to the remote server (apart from the acts needed to initially authenticate the device with the user's wifi router).

Navigation and Mapping

Preferably the wireless module is a wifi module, and is configured to record the wifi SSIDs of wifi routers/devices as it passes them as route data, and to include the route data when transmitting the aforementioned data to the remote server.

For privacy reasons the first/last wifi SSIDs recorded in any particular journey should either not be recorded or should be deleted upon receipt at the server (and also it should be noted that image/video data should not be recorded, or else should be deleted, if it relates to the beginning or end of a journey in order to protect the user's privacy). Additionally care should be taken to ensure that the SSIDs are only recorded in such a way as to enable the cycle route/position to be determined, and not in a way that undermines the privacy of either the cyclist or the owners of the wifi routers. In particular when providing data on unsafe overtaking events the location of the event and indeed any identifying information regarding the cyclist should not be shared or stored (unless the cyclist is likely to want to have control over his/her uploaded data, in which case storing some personally identifying information may be necessary and appropriate).

That said, the advantage of collecting wifi SSIDs is that this enables a route to be determined (based on the known locations of wifi routers identified by their SSIDs). By identifying the approximate locations of unsafe overtaking events on various routes, a map can be generated (by collating and processing the data from many devices) showing the most common locations where unsafe overtaking occurs.

Such an anonymised hazard map could then be used to inform others of dangerous locations, such as civil planning organisations that need to plan where to build cycle paths. Indeed, the device could even be programmed to download relevant parts of the hazard map data, and to issue a warning (E.g. a sound) to the user when it calculates (again based on the wifi SSIDs that it passes) that the cyclist is approaching one of these dangerous locations.

As an alternative location method, the device could have a satellite navigation module (GPS/Galileo etc). This does increase the power consumption and cost of the device, however in the mobile phone implementation approach this generally does not increase the cost).

Light Displays

Preferably the device comprises:

a display comprising a light;
and wherein:
the computer processor is arranged to control the device in either of two modes:
A first operative mode in which the device records the image data and vehicle proximity data in such a manner that would cause it to be transmitted to the remote server when possible;
A second non-cooperative mode in which the device does not record the image data and vehicle proximity data in such a manner that would cause it to be transmitted to the remote server when possible;
and the computer processor preferentially operates in the first operative mode, but operates instead in the second non-cooperative mode in the event that a predetermined data criterion is satisfied, the predetermined data criterion relating to at least one of:
an amount of available space in the data storage device is below a threshold level; and/or,
a predetermined duration has elapsed since a last occasion on which the device uploaded data to the remote server, based on a clock and a recording by the device of such last occasion;
and the computer processor is arranged to control the display to indicate the status of the predetermined data criterion.

This has the effect that the user is even more strongly motivated to connect/locate the device to transmit the data. This increases the probability that a driver who overtakes in an unsafe manner will be subject to the consequence that evidence of this will be identified and uploaded to a server for insurance companies to potentially modify insurance premiums based on it (and/or for law enforcement agencies to take action and/or potentially for the public to view).

Typically the display will indicate by one lighting arrangement that the predetermined data criterion is not fulfilled (i.e. that the device is operating in the first operative mode—e.g. by lit LEDs operating in a distinctive fashion) and by a second lighting arrangement that the predetermined data criterion is close to being fulfilled (e.g. by a lit amount of a row of LEDs, which then reverts to the lit LEDs operating in a distinctive fashion) and by a third lighting arrangement that the predetermined data criterion is fulfilled (e.g. by lighting in a different manner—such as a simple blinking light).

Preferably in the first operative mode the light display operates in a first light display mode, and in the second non-cooperative mode, the light display operates in a second light display mode.

This has the effect that the user is even more strongly motivated connect/locate the device to transmit the data. This is because drivers who understand the consequence of the first light display mode will only be motivated to drive more safely when the device is in the first operative mode. Thus the user, for their own safety is motivated to ensure that the device has regular opportunities to connect to the internet (E.g. via their home wifi router and broadband internet access) to upload data to the remote server.

Typically the first light display mode is a distinctive light pattern (generally red LED light) and the second light display mode is a non-distinctive (or less distinctive or different) light pattern. For example the first light display mode could have multiple LEDs varying in brightness at different times, while the second light display mode could have just an LED flashing or perhaps several LEDs flashing with the same timing.

Optionally, the device comprises a light having a lighting direction (i.e. the mid angle of a lighting field of view) and comprises a camera having a camera direction (i.e. the mid angle of a camera field of view), and the lighting direction and the camera direction differ by at least 20 degrees. This has the advantage that the light can provide a warning to drivers in one direction representing a first point in an expected vehicle trajectory, while a camera angle can be optimised to record the drivers' vehicles when they are at a second direction representing a second, closer, point in an expected vehicle trajectory. Preferably these angles differ by 30 to 180 degrees. In one example the light faces to the rear, or within 20 degrees of the rear direction, and the camera faces at 45 degrees to 90 degrees from the rear (but still substantially horizontal), or at 90 degrees from the rear. In another example the light faces to the rear or within 20 degrees of the rear direction, and the camera faces within 20 degrees of the opposite, forward, direction. Preferably the difference is 40 to 110 degrees with the light facing within 20 degrees of the rear direction. Note that rear direction is an in-use direction when the device is assembled to a bicycle (or particularly a bicycle seat). Such orientations may be at least partially dictated by an included bracket e.g. as described herein.

Pollution Sensor

Optionally the device also comprises a pollution sensor. A pollution sensor (e.g. NOx and/or particulate sensors) enables the device to log the levels of pollution along its route (again using wifi SSIDs along a path, or else satellite navigation). Again this could be used to generate a map that could benefit either users or to benefit the public.

Another benefit of a pollution sensor is achieved if the device issues a warning to the cyclist in the event that levels of pollution increase exceed a threshold amount. While cyclist often are well aware of causes of sudden pollution (E.g. they are behind a bus) they have difficulty determining exactly when it is safe to start breathing again, because this depends on the precise wind conditions. It would be useful to be alerted exactly when the pollution levels have dropped so that the cyclist does not have to hold their breath any longer than necessary and does not risk breathing too early.

One problem with road cycling is that drivers sometimes overtake aggressively. This is typically because due to (perhaps understandable) impatience, they often overtake when it is not an ideal time to do so. Aside from being dangerous it has the consequence that the driver often changes down to a lower gear and accelerates hard, which in the case of diesel powered vehicles leaves the cyclist in a small (sometimes large) cloud of diesel fumes. If the cyclist is cycling hard it will be difficult to pause breathing repeatedly so most cyclists tend to just breathe in the pollution except in the worst cases, accepting the health hazard it presents.

Although this is partly just an accepted hardship for cyclists, a small proportion of vehicles have poorly maintained engines which cause an unreasonable amount of pollution and some of them undoubtedly exceed the statutory thresholds of the relevant country.

Optionally the device records vehicles which overtake in the event that the pollution sensor detects particularly dense pollution within a predetermined period of time (i.e. above a threshold value, or an increase in excess of a threshold increase—because many pollution detectors have relative outputs not absolute ones). Data on such overtaking events (or vehicles in general) is then transmitted to the remote server.

It should be noted that it is often not possible to infer that an increase in pollution is associated with a particular vehicle. However with lots of these devices reporting back to the server, it will be possible to identify vehicles regularly associated with increased pollution, and to notify the list to the relevant civil authorities.

Clearly the authorities will typically not take action regarding buses and lorries. However it could be expected that they may take action regarding cars or vans in specific cases where there is strong evidence that statutory emissions limits have been exceeded (for example prioritising a visit to the premises of the owner of those vehicles to perform a vehicle emissions test).

This would have two benefits for cyclists. Firstly it would motivate drivers of particularly polluting vehicles from changing down a gear and revving their engines hard to quickly overtake a cyclist who has such a device—this, combined with the main effect of the device discussed above contributes to ensuring that drivers treat cyclists respectfully, which would lead to more people being willing to cycle (and an overall greener planet as a result). Secondly, it would mean that the relevant authorities would finally be able to identify those vehicles which produce excessive pollution and to take action, thus leading to healthier cycling conditions for everyone.

Inputting the Wifi Router Details into the Device

Preferably the computer processor is arranged to:
receive image data from the image data recorder;
process the image data to identify a bar code; and
identify in the barcode at least a password;
to control the wireless module to use the password to access a wireless data source.

This has the advantage that the user can easily configure the device to access their home wifi router by generating a barcode, for example on their mobile phone, and positioning the barcode in front of the image data recorder (e.g. the video camera). Typically a 2D barcode (known as a QR code) would be used, as this can easily encode larger amounts of information than a 1D barcode and because algorithms to detect and read such QR codes are widely available.

There are various ways that a barcode can be generated. For example websites already exists where you can type in some information and a barcode will be generated. A more secure method (for encoding a wifi password!) would be to provide a dedicated app for the user to download onto their mobile phone.

Generally, the display/light can be used to indicate to the user that a wifi SSID/password is needed before the device will operate, or that the device is waiting to check that it can connect to the wifi hotspot/router before it will enter normal operating mode.

User Marking of Events of Interest

Preferably the device comprises a button; and
the computer processor is arranged to respond to the actuation of the button by marking the most recent image data and vehicle proximity data as relating to an event of interest such that this data is not deleted.

Preferably the computer processor is configured to upload to the server any data marked as relating to an event of interest. This has the effect that any weaknesses in the computer processor's ability to identify poor driving based on sensors or image data (or indeed any additional analysis on data received at the remote server), is complemented by the ability of the cyclist to identify poor driving themselves. This places the cyclist in charge and means that any unsafe behaviour can be reported, for example a driver who overtakes at a safe distance and speed but then brakes hard immediately after overtaking.

Further Embodiments and Aspects

According to a fourth aspect of the invention there is provided a bicycle comprising the device of the first (or second, or third) aspect.

According to a fifth aspect of the invention there is provided a method of encouraging safer driving, comprising the steps of:
  providing:
    an image data recorder, arranged to record image data;
    a vehicle proximity detector, arranged to generate vehicle proximity data;
    a computer processor;
    a data storage device; and
    a data transmission module arranged to transmit to a remote server;
  and controlling the computer processor to:
    identify from the vehicle proximity data, vehicle overtaking events which satisfy a predetermined overtaking manoeuvre criterion,
    identify portions of the image data recorded at the time of such overtaking events, and
    control the data transmission module to at least preferentially transmit those portions of the image data to the remote server.

According to a sixth aspect of the invention there is provided a method of encouraging safer driving, comprising the steps of:
  providing:
    an image data recorder, arranged to record image data;
    a vehicle proximity detector, arranged to record vehicle proximity data;
    a computer processor;
    a data storage device; and
    a data transmission module arranged to transmit to a remote server;
  and controlling the computer processor configured to:
    identify, at least partly from the vehicle proximity data, vehicle overtaking events in which a predetermined vehicle overtaking manoeuvre criterion is met;
    record image data from the image data recorder to the data storage device, either in response to the vehicle proximity criterion being met or substantially continuously;
    identify first periods of time during which a predetermined overtaking manoeuvre criterion is met, and second periods of time in which the predetermined overtaking manoeuvre criterion is not met;
    control the data transmission module to selectively transmit image data relating to at least the first periods of time, such that:
      in the image data transmitted, a pixel rate of the image data with respect to the time recorded has:
        at least a first predetermined value for the first periods of time, but;
        a lower or zero value for the second periods of time.

According to a seventh aspect of the invention there is provided a method for encouraging safer driving, comprising the steps of:
  Providing a server for receiving image data, comprising a computer processor;
  Receiving image data from the data transmission module of the device of the first aspect;
  Controlling the computer processor to apply an overtaking assessment algorithm to the image data to generate an assessment of vehicle overtaking safety.

According to a eighth aspect of the invention there is provided a method for encouraging safer driving, comprising the steps of:
  Providing a server for receiving image data, comprising a computer processor;
  Providing a device comprising:
    an image data recorder;
    a data transmission module arranged to transmit the image data to a remote server:
  Receiving the image data from the data transmission module of the device;
  Controlling the computer processor to apply an overtaking assessment algorithm to the image data to generate an assessment of vehicle overtaking safety.

According to an ninth aspect of the present invention a bicycle safety device is provided, configured to measure how closely vehicles overtake, and to send this data along with relevant portions of video/image data to a remote server for this to be used to discourage dangerous overtaking (e.g. the server may identify the relevant vehicle's licence plate number and share all of this data with vehicle insurance companies).

According to a tenth aspect of the present invention there is provided a method of encouraging safer driving, comprising the steps of:
  providing:
    an image data recorder, arranged to record image data;
    a vehicle proximity detector, arranged to generate vehicle proximity data;
    a computer processor;
    a data storage device; and
    a data transmission module arranged to transmit to a remote server.

Preferably the bicycle safety device is configured to measure both the proximity and speed of an overtaking vehicle, to calculate a driving safety assessment and to upload these to a remote server (e.g. when the cyclist returns home, the device connects to the internet via the user's wifi router). The device has a very distinctive light display/effect (which may double as a rear bike light) so that drivers will recognise the device and respond by only overtaking when they are able to do so safely.

To ensure that users will configure their devices to be able to upload the data, the device is preferably designed to only display its distinctive light pattern if its wifi/internet connection has been set up successfully.

According to an eleventh aspect of the invention there is provided an accessory for a bicycle comprising:
  an attachment means for attaching the accessory either:
    a) to a bicycle, or
    b) to a bicycle camera or housing thereof, that is attached to a bicycle by connector thereof;
  a vehicle proximity detector arranged such that, in use, in case a) when the accessory is attached to a bicycle via the attachment means, the detector is arranged and orientated to measure the proximity of a vehicle when the vehicle overtakes the bicycle, to generate vehicle proximity data, wherein in case b) such arrangement is achieved taking into account the shape of the camera and/or its housing, and its connector;
  a read-out for outputting the vehicle proximity data either as a visual display and/or as an audio output; and
  a computer processor configured to process the vehicle proximity data and to control the read-out to output the vehicle proximity data in substantially real-time, at least when the vehicle proximity detector detects a proximal object; and wherein the accessory is sized and arranged to fit either proximately to, or to, a bicycle camera or its housing, such that in use the video, and/or the audio recording if used with a bicycle camera that records audio data, of the bicycle camera includes the vehicle proximity data outputted by the read-out.

The term 'accessory' with respect to the eleventh aspect is used to indicate that the image data recorder is not an integral component, in contrast to e.g. the first aspect of the present invention. Thus, a commercially-available image data recorder such as a GroPro® or other action camera is required in conjunction with the accessory.

A preferred approach is that the vehicle proximity detector is a proximity measurement sensor, preferably an echo or reflection based distance sensor, and is arranged to provide a measurement beam extending outwardly from the device to measure the position of a vehicle passing into the beam.

The vehicle proximity detector could for example be:
- an audio sensor (possibly filtered to preferentially be sensitive to the noise of tyres on tarmac, and passed through an algorithm to detect gradual increase and decrease of such noises—it may even utilise a stereo microphone to estimate the direction of passing of the vehicle),
- a computer processor (e.g. the same as the aforementioned one) controlled to detect a passing vehicle from the image data (note that if only a single video camera is used it is still possible to measure distances by detecting a vehicle, estimating its size, and using the size to determine its distance, or even by using standard street furniture to accurately calibrate the camera orientation and thus determine the distance of a vehicle by the position of one of its wheels), or
- an active reflection detection based distance sensor (e.g. ultrasonic or infra-red).

Preferably the proximity detector comprises an ultrasonic sensor.

Preferably the read-out comprises a digital visual display which is preferably a lit display and preferably is an LED display. The display may be binary or use any other coding system but preferably is a decimal display. It preferably shows the units (typically meters, cm, inches or inches and feet) although the units may be a static display and may not be lit.

Generally the display updates at a refresh frequency, typically cycling every 30th of a second. Preferably the display is lit for part of the refresh cycle and dark for the remainder of the refresh cycle. For example it may be lit for substantially half of the refresh cycle.

Preferably the display comprises a first part and a duplicate part, the timings of updating of the duplicate part being delayed by substantially half a refresh cycle, both updating with frequencies, shining with durations, and having a phase offset such that in any video frame at 30 fps of arbitrary timing at least one of the two displays will provide a value corresponding to only one respective refresh cycle.

An example is if each display refreshes at 30 hz and shines for a 60th of a second during the first half of their cycle, but the two displays have update timings that are offset by a 60th of a second.

Preferably the duration each of the two displays shines for is preferably less than half of the refresh cycle, more preferably less than a quarter of it, preferably less than an eighth. This has the effect that in most such resulting videos neither display will appear to be a mix of two superimposed numbers.

Preferably the display for the vehicle proximity data is an LED display, OLED display or LCD display.

The read-out may be an audio message (e.g. speaker, buzzer, morse code, recorded spoken voice) but is preferably a visual one.

Preferably the accessory of the eleventh aspect provides of means of ensuring footage captured via an image data recorder, for example vehicle overtaking events relative to a bicycle, contains the visible display in the image data, in particular the foreground of the image data, such that real-time vehicle proximity data (e.g. distance in centimetres, distance in metres) can be observed and attributed to a specific overtaking vehicle i.e. the visible display showing vehicle proximity data is observed simultaneously with the vehicle overtaking event.

This accessory provides the advantage of an accessory that can be used in conjunction with existing image data recorders, for example GoPro(RTM) or other action cameras suitable for use by cyclists, to provide quantitative vehicle proximity data, in the form of a visible digital readout or audio output, in addition to overtaking footage which may include vehicle registration information. It is envisaged that the accessory holds an image data recorder in a desired alignment, possibly allowing movement within one, or at least one degree of freedom. The accessory of the present invention is therefore a simple means for improving the information obtained by law enforcement bodies (e.g. police, counts) from action camera footage. As a result, the accessory may help provide a deterrent for dangerous overtaking of cyclists by vehicle drivers.

Preferably, the angle of the vehicle proximity detector may be offset from the image data recorder, for example arranged such that the angle of the vehicle proximity readings are substantially perpendicular to the angle at which image data is recorded. This may allow for greater accuracy in terms of determining vehicle proximity as a given vehicle is directly overtaking a bicycle, while maximising the potential for capturing an overtaking vehicle's registration plate.

Preferably, the attachment means attaches the accessory to an action camera (e.g. GoPro® or equivalent) already mounted onto the bicycle, or even the cyclist. Alternatively, the attachment means attaches the accessory to the bicycle (e.g. via the bicycle saddle or seat post) or cyclist and provides a holder space (e.g. recess or connection) adaptable for securing an action camera. Alternatively, the holder space (e.g. recess or connection) is adaptable for securing an action camera's standard housing. The attachment means may comprises a holder or bracket, in particular a saddle rail mount. Other configurations may be envisaged that achieves the aim of ensuing an action camera can capture both footage of overtaking events and the display showing real-time vehicle proximity data, such that close overtaking events can be quantified and attributed to a particular vehicle, in particular identifying the registration number of the vehicle in question.

In an embodiment of the eleventh aspect, the accessory further comprises a USB-rechargeable battery. Furthermore, the accessory comprises an on-off slider switch.

Preferably, the accessory further comprises a recognisable red glowing symbol as a deterrent to a vehicle driver, for example a LED display such as a ring of LEDs (red LEDs or variable colour red/green/blue LEDs). Preferably, the ring of LEDs only works i.e. glows when the image data recorder is operational.

The headings above are included for ease of reading and are not limiting. Further embodiments are set out in the claims.

DETAILED EMBODIMENT OF THE INVENTION

A detailed embodiment of the invention will now be described, by way of example only, with reference to the figures in which.

Figure 1:
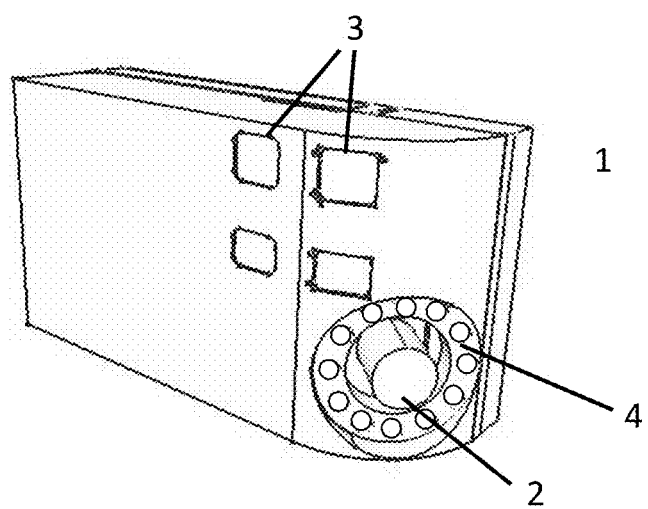
FIG. 1 is an illustration of a device according to one embodiment of the invention, for encouraging safer driving.
Figure 2:
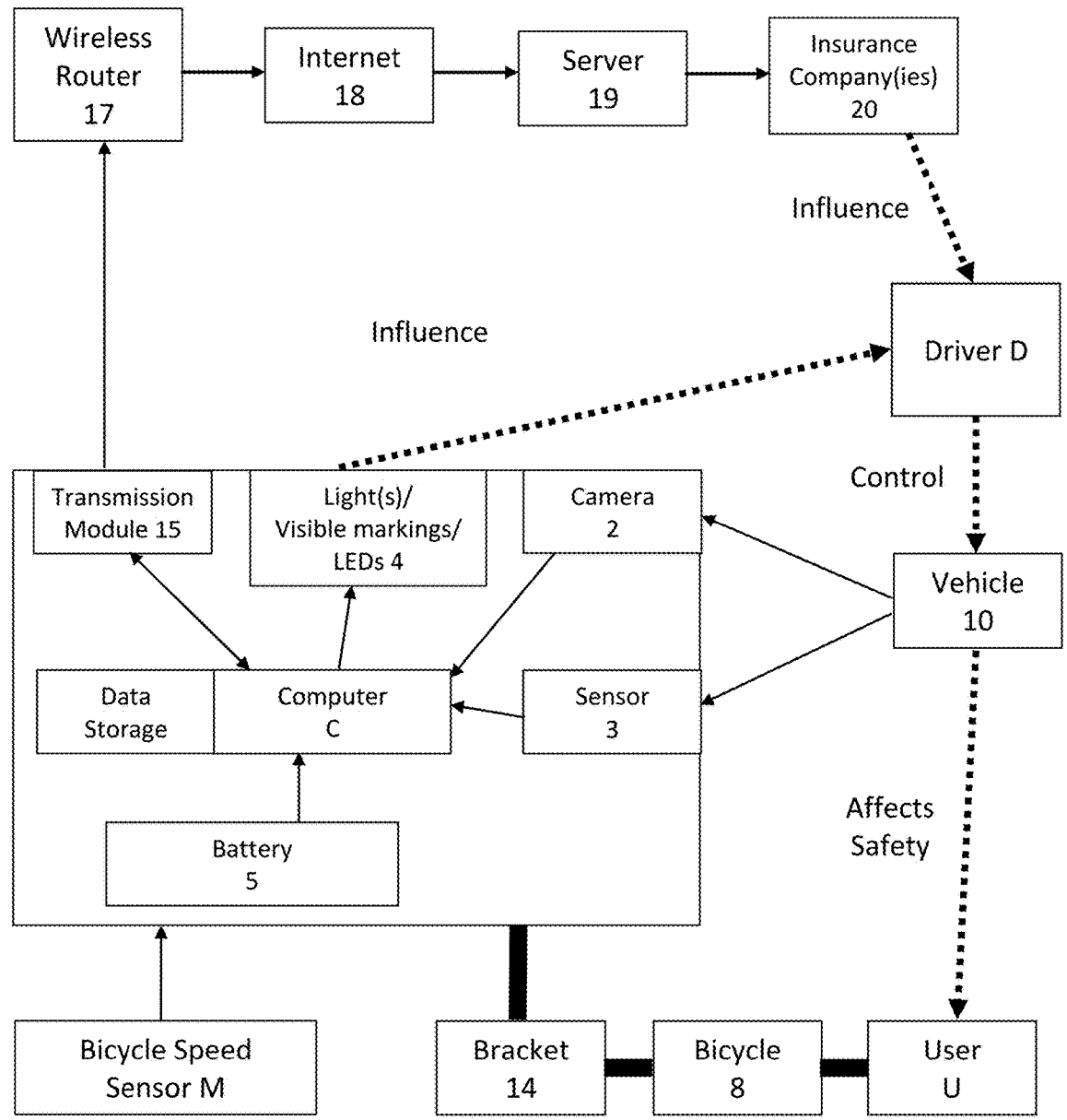
FIG. 2 shows a block diagram of a device according to an embodiment of the invention, and showing its interactions with other items.
Figure 3:
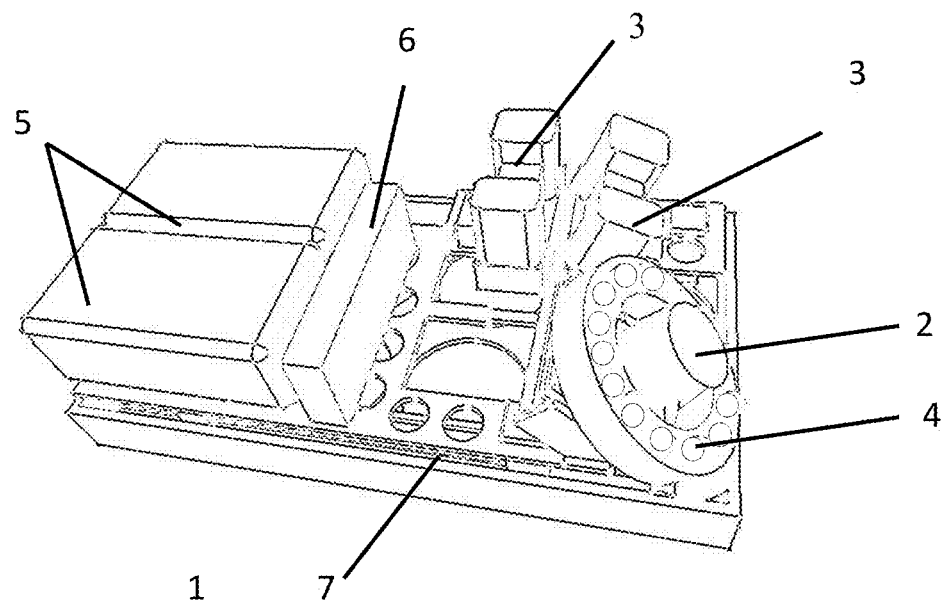
FIG. 3 is an illustration of the device of FIG. 1 with a front cover removed to show internal components.
Figure 4:
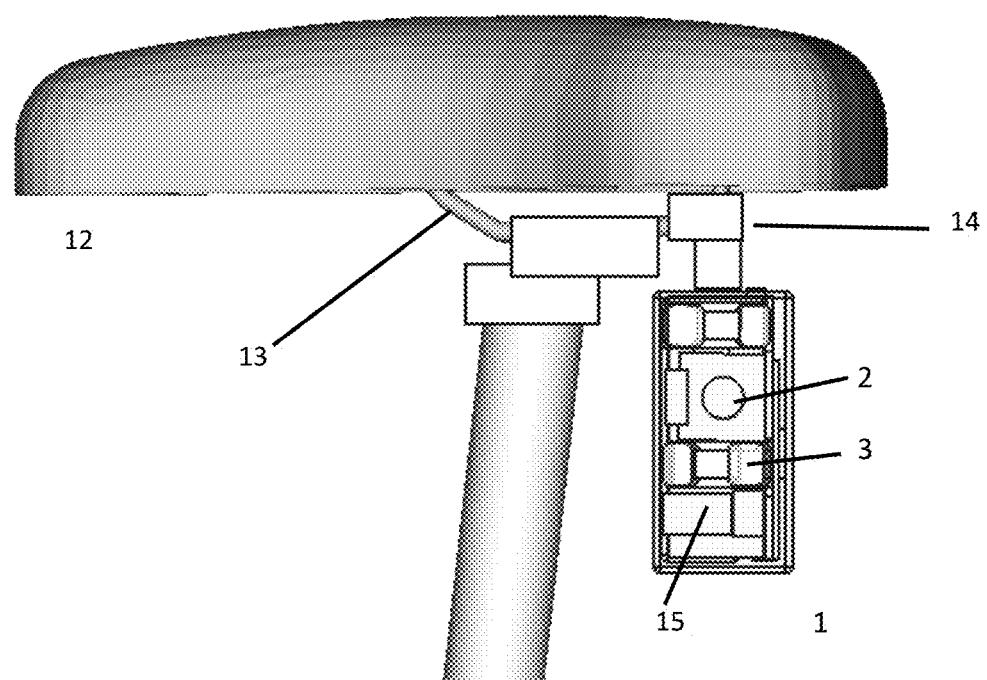
FIG. 4 shows a side view of a device according to an embodiment of the invention, attached to a bicycle seat via a bracket to the two supporting bars of the bicycle seat that connect the bicycle seat to the seat post.

Referring to FIG. 2 which sets out components of a device 1 according to an embodiment of the invention and its interactions with its environment, and FIGS. 1, 3 and 4 which illustrate a device 1 according to embodiments of the invention, and FIGS. 5 to 8 which illustrate the use of such devices. The device 1, comprises a computer C, powered by a battery 5, which controls a wireless module 15 and lights/LEDs 4, and receives data from its camera 2 and sensor(s) 3.

In FIG. 2 dotted arrows indicate directions of influence rather than directions of data flow. Some elements are shown which are optional or which are external to the device as described herein.

Using the sensor(s) and camera the device 1 is able to determine the proximity of overtaking vehicles in a direction perpendicular to the direction of travel, and preferably is able to determine the speed of the overtaking vehicles (preferably in absolute terms, using a sensor to determine the speed of the bicycle, but optionally the speed relative to the bike).

The device 1 is supported by a bracket 14 in use on a bicycle 8, which in turn supports the user U. When in range, the device 1 connects via its wireless module 15 to the user's (or another) wireless route 17, to upload via the internet 18 data on dangerous overtaking manoeuvres to one or more servers 19, so that this data may be conveyed to insurance companies 20 (and potentially, in extreme cases, to law enforcement organisations).

The data sent by the device include the proximity of the vehicle while overtaking, as well as a video or photo showing the vehicle overtaking. Generally, all available information will be transmitted. Extraction of a licence plate number from the video/photo data may be performed by the device, and/or by the server.

As the device is arranged in use to be visible to drivers D, e.g. by means of the LEDs operating in a distinctive pattern and/or shape, and because the driver is likely to be aware that the device 1 is a driving safety reporting device (either by the markings of the device, or else by publicity) the driver is aware that there are likely to be repercussions for driving dangerously, such as video data being used against the driver. Such drivers preferably are made aware that data and video of dangerous driving is automatically made available to insurance companies. This, together, influences (influence) the driver's driving behaviour and the likelihood of the driver controlling (control) the car to perform a dangerous overtaking manoeuvre is reduced and the safety of the user U is improved (affects safety).

Referring particularly to FIGS. 1, 3 and 4 which show two detailed embodiments, the device 1 has a camera 2 operable to record digital video. This may be at 1080 pixels by 720 pixels resolution at a frame rate of between 5 frames per second and 25 frames per second. The camera is surrounded by a ring of LEDs 4 (red LEDs or variable colour red/green/blue LEDs).

The ring of LEDs 4 is capable of displaying in a first operative mode which provides a distinctive appearance to enable approaching drivers to identify the device as an overtaking recording and uploading device. The ring of LEDs is also capable of displaying a second non-cooperative mode, in which the distinctive appearance is not provided (for example the LEDs may simply provide a conventional blinking display) which indicates to the user that the device needs to be connected to the internet to upload its data to a remote server. This is made possible by a wireless transceiver (see 15, FIG. 10) such as a wifi module, capable of connecting to the user's home wifi router and broadband connection.

The device has a battery (batteries 5) and voltage regulator 6 as shown in the cut-away illustration of FIG. 2, and has two beam-type sensors 3, which in this embodiment are infra-red sensors. The infra-red sensors each consist of an emitter and detector, and operate by emitting a pulse of infra-red radiation in a beam direction, and monitoring for reflections from nearby objects. Each time the detector detects a reflection the emitter sends another pulse (essentially immediately), and the frequency with which this cycle repeats is recorded and outputted as an analogue voltage, which is converted to digital, and from a calibration table converted to calculate the distance of the nearby object which is in the path of the beam.

While the sensor could be just a detector, it is strongly preferred to accurately measure the distance of any vehicles interrupting each beam, for example to the nearest 1-2 cm. By placing the beams a distance apart, or more typically by arranging them at suitable differing angles from the device, it is possible to determine both the time that each beam is cut, and distance that this occurs at. From these two data points (position of the front of an overtaking vehicle at two particular times), it is possible to calculate the speed of an overtaking vehicle as well as its proximity (this requires data on the relative arrangement and angles of the two beams). As an alternative (or in addition) the timing when the vehicle ceases to interrupt the beams can be used to measure the distance and relative speed of the vehicle. An example of one suitable sensor is the Sharp™ model GP2Y0A02YK which provides a narrow detection beam and accurate measurement (about 1 cm accuracy) from 20 cm to 150 cm. Ultrasonic sensors are particularly suitable for measuring proximity, however they operate at a lower frequency (typically 10 Hz rather than 100 to 200 Hz) and thus will not provide accurate speed measurement where two of these sensors are to be used together to measure vehicle speed, unless the vehicle speed is very low.

The device preferably includes a bicycle speed detector (not shown). This could include a GPS receiver, but preferably includes a wheel rotation speed detector (generally a magnet detector fixed near one of the wheels and a magnet detector on the bike frame to detect the magnet, as is known from the field of bicycle speed monitors). In a preferred embodiment the device includes as a second and third unit a magnet for connection to a bike wheel, and a magnet detector for connection to a bike frame, the magnet detector preferably having a wireless data connection with the main unit (shown) of the device. One problem with wheel rotation speed detectors is that different bikes (children's bikes, mountain bikes, road bikes etc), have different wheel diameters and this needs to be accounted for.

One way to correct for the unknown wheel diameter is for the user to input the wheel size into the device (see discussion on data input), but another way to do this is for the computer processor to determine the bike speed by detecting the relative backward speed of objects that the bike passes (as opposed to objects overtaking the bike)—"passed object events". A passed object event typically corresponds to the bicycle passing a tree, post, wall edge, or other stationary or slow-moving object. Generally there will be many of these during a typical journey.

By building a table of such "passed object events" and recording in tandem the wheel rotation speed at the time of each of those events it becomes possible to identify the wheel diameter (or circumference or radius). A simple way to achieve this is to assume a particular wheel diameter (e.g. 26") and calculate the assumed bike speed at each "passed object event" and determine if each assumed bike speed matches a statistically significant proportion of the calculated backward speeds of the passed objects. This can be repeated for a variety of wheel diameters (e.g. from 9 inches to 29 inches), to determine the wheel diameter for which the assumed speeds best match the calculated backward speeds of overtaken objects. The advantage of this approach is that it provides for nearly real-time bike speed measurement (unlike GPS devices), and avoids the cost and energy use associated with a GPS receiver. Requiring the user to input the wheel diameter carries a strong risk that the user will enter an incorrect wheel diameter, especially if the device gets transferred from one bike to another by a user, and the approach above alleviates this problem too. In general, the device should continuously monitor such data and repeatedly recalculate the bike's wheel diameter, so that it can account for being moved from one bike to a different bike.

In view of the above, the device can calculate both the proximity of an overtaking vehicle and the bike speed, and the absolute speed of the overtaking vehicle. Based on at least the proximity and overtaking vehicle speed (optionally relative overtaking speed but preferably absolute overtaking speed) the device performs a calculation to generate an assessment of the safety of the overtaking manoeuvre. Such calculation may be devised by the skilled person based on safety testing on roads, and/or on legal criteria.

Vehicle distance may be calculated from the centre-line of the frame of the bike (see above on how to ensure the device is at a controlled position on the bike), or may be calculated from a predetermined distance away from the centre-line of the frame of the bike (i.e. a value corresponding to the typical distance that a cyclist's body extends from the centre-line of the bike frame) or indeed from the measured extent of the cyclist's body (if the device is capable of measuring this).

As an example, a minimum overtaking distance might be defined as 10" (25 cm) from the centre-line of the bike-frame, plus the overtaking vehicle's absolute speed in miles per hour (mph). So at 10 mph the minimum is 20" (51 cm) from the bike's centre-line, at 30 mph it is 40" (102 cm), and at 60 mph it is 70" (152 cm).

If the device does not (or cannot in a particular journey) calculate the overtaking vehicle's absolute speed, the overtaking vehicle's relative speed can be used instead.

The examples above involve adding one inch per mph because this calculation is simple for drivers to judge, with the advantage that drivers can find out what is expected of them in order to alleviate driver anxiety. The skilled person may use a more sophisticated calculation, perhaps combining both bike speed and overtaking vehicle speed, and perhaps taking into account the width of the cyclist (e.g. as measured by stereoscopic video in real-time).

While the assessment may be binary (too close vs. far enough), it is preferably more granular. For example the criterion might be 10" from bike frame as a minimum and an extra 1"/mph but preferably 1½"/mph and more ideally 2"/mph. This enables the device to grade overtaking manoeuvres on a more granular scale such as Good/Poor/Unacceptable.

The granular assessment may be linked to relevant legislation or road safety rules, such as for example in Florida which requires a 3" overtaking distance, and a proposal in Canada that vehicles should leave 3" when overtaking at under 50 km/hr, at least 4" for 50-80 km/hr and at least 5" for speed exceeding 80 km/hr. Such assessment criteria could be implemented on a country specific or even state-specific basis, if the user is prompted to input the location (and for example if this is double checked by the remote server using the IP address of the device).

The device records the video via camera 4 to a data storage device (not shown) such as an SD card™, and for each overtaking event that matches the overtaking criterion a section of matching video data is marked for upload. For example if an overtaking event is graded as "Unacceptable" then a section of video data corresponding to the 5 seconds (or another predetermined interval) preceding and following the overtaking event is marked for upload.

The device is configured to upload such highlighted video data along with the sensor data corresponding to that overtaking event in the event that the device is able to connect to a remote server 19. Generally this occurs when the user takes the device into their home to charge it (e.g. from a USB cable) which typically ensures the device is within range of the user's home wifi™ router 17.

In order to set up the device the user must input to the device the password (and typically also the name or SSID) of the user's home or business wireless network. This can be ensured by configuring the device to be inoperative unless provided with such connection details—or more typically unless the device has been able to connect to the wifi™ network 17 and via the internet 18 to a server 19 at a predetermined (fixed or variable) internet address.

To permit the user to input the wireless network connection details, a keypad may be provided, or a USB connection to enable connection of a keyboard, or the device may allow for a wifi™/Bluetooth™ connection from a smartphone to input the wifi™ details or any other method.

One preferred method is to configure the computer processor to monitor video data from the camera 2 for a barcode such as a 2D "QR" code. The user may then download a QR-code-generating app onto their smartphone (not shown) and input their wireless network details to generate a QR-code, or the user may access a secure website capable of generating a QR-code based on the details inputted by the user. Irrespective of how the QR code is generated, the user generates a QR-code encoding the wireless login details for their home/business network, and shows the QR-code (on their phone or computer) to the camera of the device. The device is then able to scan and read these details, and is configured to then search for and connect to a wireless network based on the details. This provides a simple way for a user to input their wireless network login details to the device.

The device is configured to provide a red LED display 4, which provides two functions. Firstly it provides the effect of a rear bike light. Secondly it lights in a distinctive fashion to indicate that it is operative—this indicates both to the user and to overtaking drivers D that the device is working, and that is recording and monitoring overtaking manoeuvres, and recording the data for later upload.

The device also has a second display mode, such as a simple flashing red light. This still provides the effect of a rear bike light, but it indicates to the user that the device's memory is full and the user knows that he/she must allow the device to connect to the internet to upload video data (etc) on unsafe overtaking manoeuvres in order for the device to become fully operative again.

Note that as an alternative or additional criterion to a data fill level, it is possible to require that the device must be connected to the internet periodically (E.g. once every one, three, six or twelve months) in order to upload data. This has the advantage that it ensures that data on unsafe overtaking events will be uploaded relatively soon after those events occur, even though the device 1 has a very large data storage device which is not at risk of becoming full because (for example) the device deletes unneeded video data. Thus the device may refuse to operate if it has been too long since the device was connected to the internet.

Preferably when the user U turns the device 1 on or off (via a button—not shown), the device indicates whether the data storage is close to being full (and/or that it is close to being too long since the device was connected to the internet). This can be indicated by a row of LEDs being lit continuously for (e.g.) 3 seconds, and a larger number of lit LEDs indicates that the criteria is not close to being met, while a smaller number of lit LEDs indicates that the criteria is close to being met (E.g. data is running out or it has been a long time since the device connected to the internet). This helps the user to manage data uploads and thus avoids the situation that the device refuses to be operative.

In a preferred embodiment the device also has a pollution sensor (typically a device which has a resistance that varies in the presence of particular atmospheric compounds and/or of particulates), and the device also records increases in pollution associated with each overtaking event, so that excessively polluting vehicles can also be identified and the data and video evidence can be uploaded. Due to the difficulty in reliably associating a sudden rise in air pollution with a particular nearby vehicle, the server would only list such vehicles if multiple users' devices had recorded the increase in pollution being associated with that vehicle. Vehicle's is identified (from their registration plates) as being for example buses might be ignored and no action taken.

The server 19 is not a required part of the device, however it can usefully play a role in helping to promote driving safety. The server 19 receives and stores the data from multiple devices, and typically will perform additional checks. For example it may apply various computer algorithms in order to double check that the overtaking assessment of the device was not erroneous (E.g. if the user's hand or bag-strap had passed through the sensor beams this could result in an erroneous detection of vehicle speed and proximity, however a computer algorithm could be designed and applied to distinguish such events from genuine overtaking events). Further the server generally will apply a vehicle registration plate detection algorithm to identify the vehicle registration of the overtaking vehicle. Such algorithms may for example be obtained from open source software sources.

The server then presents the overtaking assessment, along with the overtaking vehicle registration plate number and the video evidence, in tabular/database form. This data may be made available to one or more vehicle insurance companies 20 so that the vehicle insurance companies can choose whether (and how) to modify future insurance premiums based on the data. This completes the causal chain of events by influencing drivers to not drive dangerously close to the bicycle 8 and user U.

How the companies use the data is up to them, however the fact that the data is being provided to one or more vehicle insurance companies and may influence insurance premiums is sufficient to act as a deterrent and to motivate drivers D to only overtake at a safe speed and distance. Generally, some publicity will typically be useful to ensure that drivers will typically be aware of the function of the device and its (distinctive LED display) appearance, however alternatively the devices may simply provide by their appearance or markings on the device (e.g. "proximity monitoring, licence plate detection and automatic upload to insurance companies" or indeed more simple and brief markings) an indication that the device is not merely a conventional bike cam.

Thus in isolation the device does not necessarily have the desired effect, but if used and provided in an appropriate manner as described above, the device will strongly incentivise drivers to only overtake at a safe speed and distance.

The device may have multiple cameras, but a wide angle camera is generally desirably (diagonal field of view of 120 degrees or more). In the design shown in FIGS. 1 and 2 the camera is arranged to face horizontally in use, and at 45 degrees away from the plane defined by the bike frame (based on the bracket connection to the bike saddle) so as to face partially sideways and backward in use. Alternatively a wide angle camera may be directed substantially perpendicular to the plane of the bike frame in order to capture events both behind and in front of the bike, as well as particularly capturing the overtaking manoeuvres themselves. The device 1 should have a bracket 14 that connects to the standardised double support bars 13 of the underside of modern bike saddles 12. This bracket connection enables the device to be oriented to record events either to the right of the bike (for use in the UK) or can alternatively be connected the other way around in order to record events to the left of the bike (for use in most other countries of the world).

However the bracket 14 is arranged that once the user has selected between the substantially two possible orientations of the camera 2 and sensors 3, the orientation is then limited such as to be consistent from one bike to another. This has the advantage that it is easier to control the computer C to accurately interpret the sensor data if the possible orientations of the camera and device are constrained.

Preferably the device has a button or other user input device (not shown) arranged such that a cyclist can activate the input device conveniently while cycling. This may include a large button on the main part of the device (e.g. under the saddle), or may be a button on a further part of the device (not shown) for connection to a bike's handlebars or frame, for example connected by a cable.

The button has the effect of marking a segment of video data as relating to objectionable road user behaviour. This might include abusive drivers or dangerous driving, or unspecific criminal activity. A predetermined length of video segment is marked if the button is pressed (the length of the clip that gets marked might be dependent on the number, duration or strength of pressing of the button, or may be fixed—for example one press might indicate to mark 5 seconds of video data before and after the press, two presses might indicate 60 seconds either way, and three presses might indicate 15 minutes either way).

Video data marked by the cyclist in this way should be treated differently from video data identified by the device as relating to an unsafe overtaking event. This is because the former is based on a subjective assessment and the latter based on an objective assessment. The data marked by the user might be made available to the user via a user interface either by smartphone connection to the device, or by browser based access to the server. The user may be permitted to crop the duration of the video data and to add metadata (tags) such as "dangerous" or "interesting" and the data might be made available for the user to make use of in various different ways (E.g. to upload for general interest to youtube.com or similar, or to provide to the police if appropriate). This data typically will not be automatically shared with insurance companies due to the subjective nature of the assessment and data collection.

Where the button is provided on a separate unit (not shown) e.g. connected by a cable, the separate unit preferably provides a white front bike light, and preferably includes a second video camera for mounting on the bike's handlebars, however typically this may collect lower resolution (E.g. VGA) than a main camera. These components are preferably powered by the battery in the main unit, and are connected by a cable connects via a quick-release bracket, so that removal or attachment of the main unit automatically connects or disconnects the cable to this/these component(s).

Figure 5:
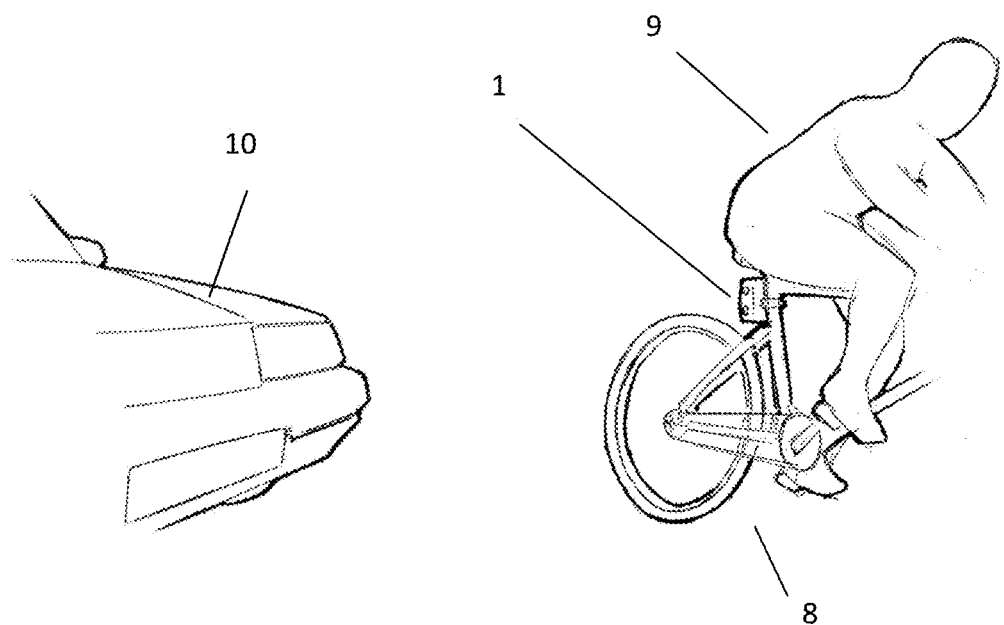
FIG. 5 is a perspective illustration of an in-use scenario of a device according to an embodiment of the invention.

Referring to FIGS. 5-8, an in-use situation is illustrated, where in FIG. 5 a user U sits on a bicycle 8 with a device 1 according to an embodiment of the invention. A car approaches from behind oriented to overtake the bicycle.

Figure 6:
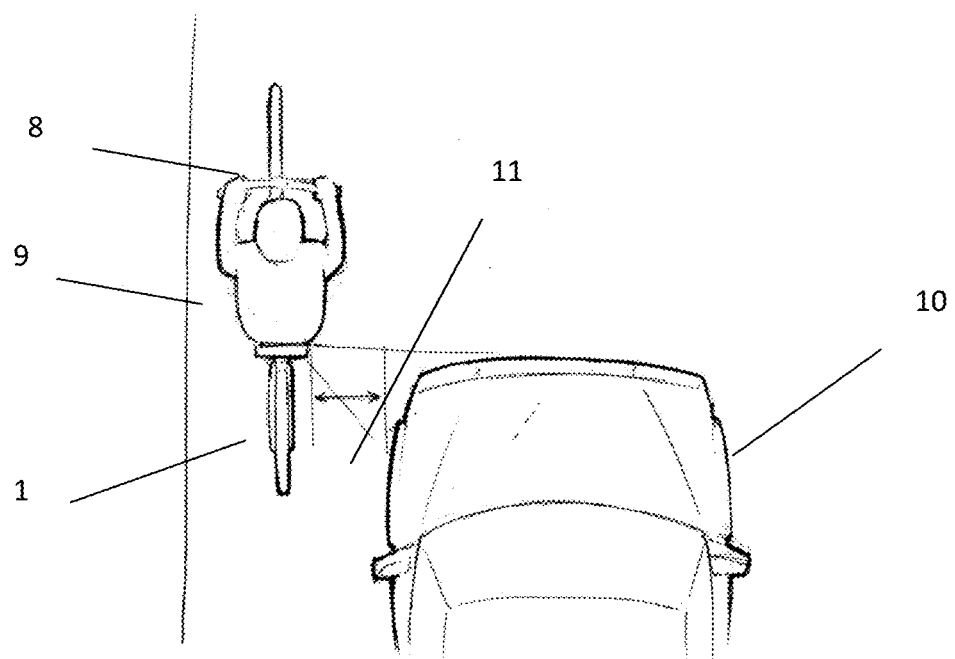
FIG. 6 is an illustration of an in-use scenario of the device of FIG. 3 from a bird's eye view.

In FIG. 6, the car is shown from above overtaking the cyclist. The horizontal distance measured by the device 1 is the minimum distance in the direction substantially perpendicular to the plane of the bicycle frame, or put differently is substantially horizontal and substantially perpendicular to the direction of travel of the bicycle. To achieve this the sensor(s) is arranged at a predetermined angle relative to the device 1, and the device has a bracket which is arranged to limit the possible orientations of the device to the bicycle or bicycle seat, such that when the user connects the device via the bracket, this ensures the sensor is oriented in the aforesaid direction.

Note that the bracket may permit two arrangements, one oriented with the sensor pointing out to the right of the bicycle) for left hand driving/cycling in the UK and Australia, and the other (oriented with the sensor pointing out to the left of the bicycle) for use in most other countries. Of course, it is not a particular problem if the bracket happens to permit some other nonsensical orientations, such as the sensor pointing downwards, as the user would not select these orientations provided that the position of the sensor and/or camera or other useful directional markings are visible to the user.

Figure 7:
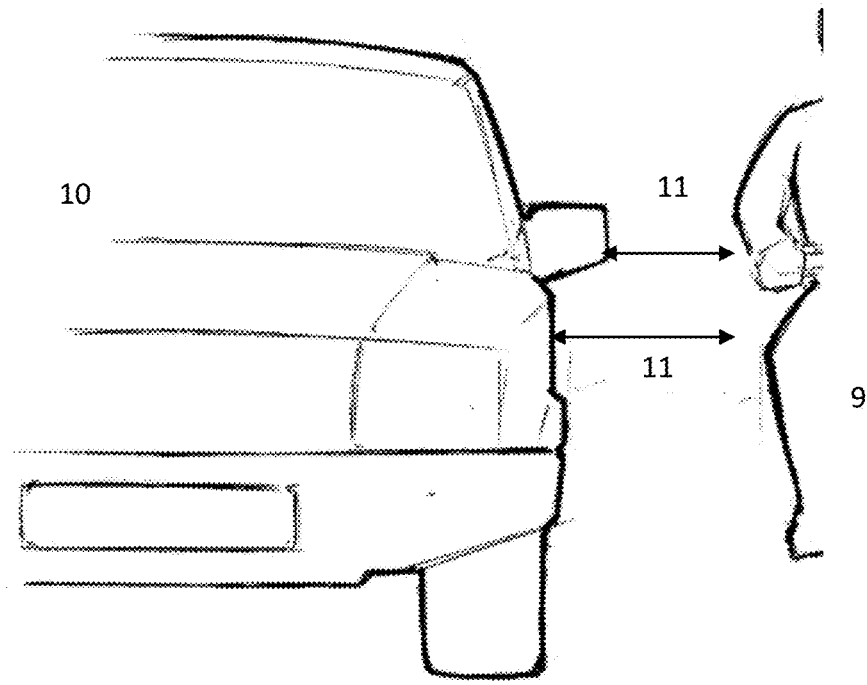
FIG. 7 is an illustration of an in-use scenario of the device of FIG. 3 from in front of a user.

In FIG. 7 the cyclist, bicycle and overtaking car are shown from in front of the cyclist. The distance to be measured by the device may be from the centre-line of the bicycle, but preferably is from the actual or (more realistically) the notional extent of the cyclist. Typically a cyclist and bicycle, accounting for their hips, elbows and the handlebars (the latter especially important with mountain bikes) can be considered to be 60 cm wide, which means that the cyclist/bike notionally extends 30 cm from the centre-line of the bicycle outwards. Thus measurement of the distance of a vehicle should be the distance from such a point (i.e. point 30 cm outward from the centreline of the bicycle).

The distance to the vehicle is the closest that any part of the vehicle comes, typically the wing-mirror. However as the sensor has a directional beam, the wing mirror may not be detected, and instead it will be the closest part of the body of the vehicle, in the direction of the sensor—i.e. at a height of the sensor (typically 1 m above the ground for an adult bicycle).

Figure 8:
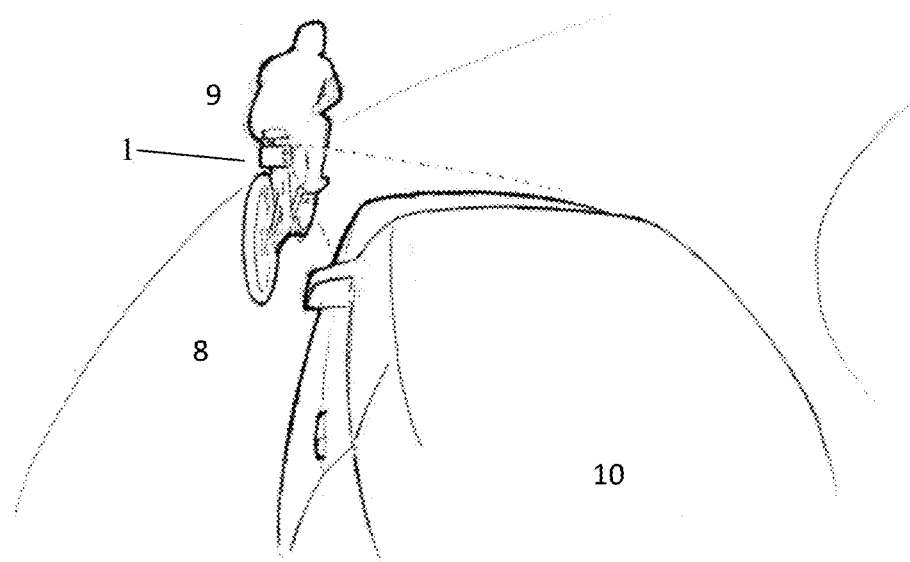
FIG. 8 is a perspective illustration of an in-use scenario of the device of FIG. 3 from behind a user.

In FIG. 8 a rear perspective view is shown of an in-use arrangement. Here the LEDs (or other lighting or other markings) and optionally the camera, are clearly visible to the driver as the driver approaches the bicycle in preparation to overtake. This ensures the driver is aware of the device and increases the likelihood that the driver will recognise at least some of the capabilities of the device.

Figure 9:
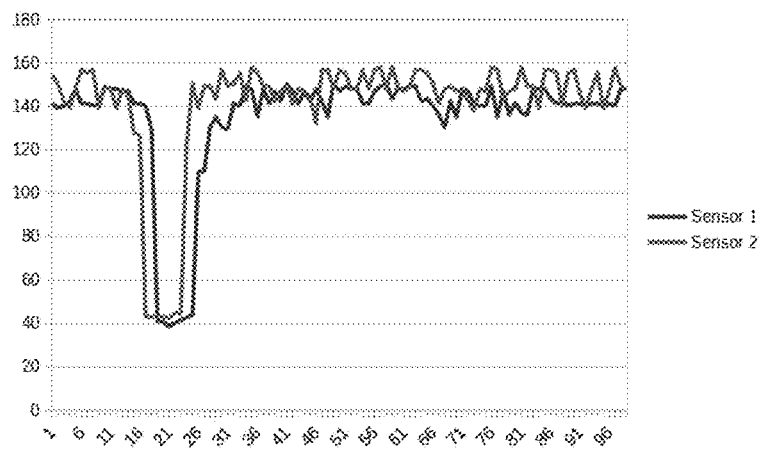
FIG. 9 shows a graph of data from two proximity sensors according to an embodiment of the invention.
Figure 10:
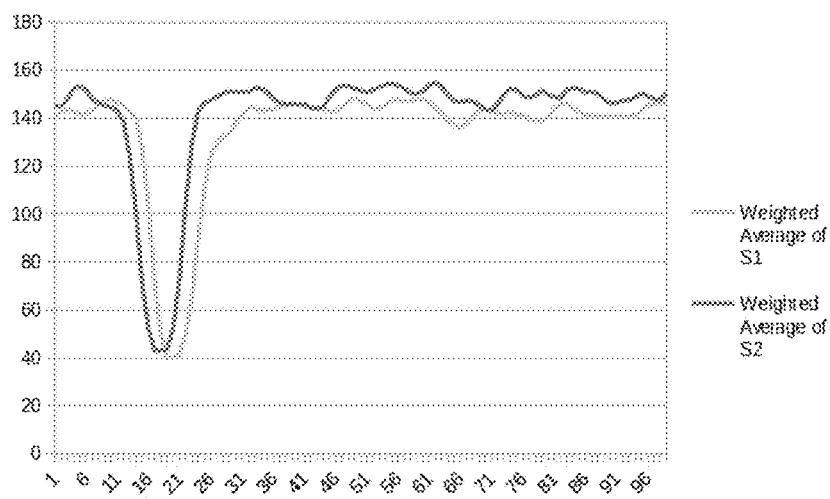
FIG. 10 shows a graph of weighted averaged sensor data of the sensor data of FIG. 7.
Figure 11:
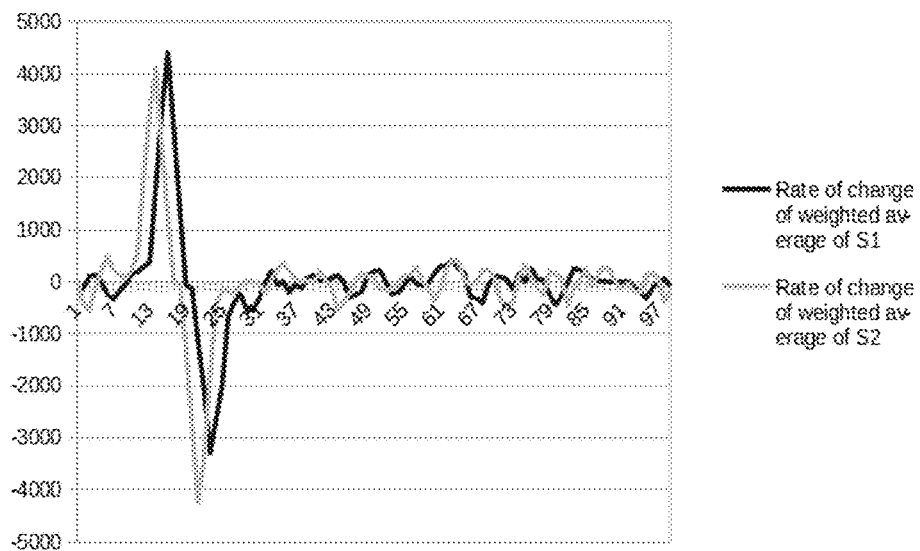
FIG. 11 shows a graph of the rate of change of the weighted averaged sensor data of FIG. 8.

Turning to FIGS. 9-11, three graphs are shown, illustrating how sensor data may be used to detect both the minimum distance of an overtaking vehicle, and its speed relative to the bike. To determine the absolute speed, determine and add the absolute speed of the bike (E.g. using a magnetic wheel sensor and data on the diameter or circumference of the wheel).

FIG. 9 shows 100 data readings from two sensors which are both directed horizontally and near to the perpendicular direction from the plane of the bike frame. Sensor 1 is aimed slightly backward of the perpendicular direction and thus is the first sensor to be affected when a vehicle overtakes. Sensor 2 is aimed slightly forward of the perpendicular direction and thus is affected by an overtaking vehicle slightly later.

Note that data element 1 is the most recent reading, while data element 100 was taken a period of time ago. Generally the sensor can be read 100 to 200 times a second, however typical modern computers are not real-time processors, and thus the time of each sensor reading should be recorded.

Around 26 sensor readings ago, sensor 1 ceased to return its maximum distance, and instead returned a distance of 44 cm which (based on the sensor's actual position 10 cm from the centre-line of the bicycle) equates to 24 cm from the cyclist).

A few sensor readings later sensor 2 also exhibits the same pattern. A short period of time Sensor 1 and then Sensor 2 revert to their maximum range.

This indicates that an object overtook the cyclist, rather than being passed by the cyclist, and based on the proximity this suggests it was a potentially dangerous overtaking event.

Whilst this example exhibits relatively clean data and a clear overtaking signature, some events may include more sensor noise, and more variation. For example due to rain drops occasionally interfering with the range estimation, or more typically due to the vehicle having glass windows which may cause the sensor to fail to detect the range of the vehicle at all times.

The data is smoothed as shown in FIG. 10. Here a weighted average has been applied over a number of sensor data readings for each of sensor 1 and sensor 2 data. Again the overtaking signature is clear, and the time difference between them gives a clear indication of the time it took the vehicle to cut the two beams. Note that the beams are not parallel and thus the vehicle speed is not simply inversely proportional to the time difference, but rather the position of the front (and/or rear) of the vehicle at each point should be calculated and the speed calculated from the time it took to travel that distance.

In FIG. 11, the rate of change of the weighted data is shown. This takes into account the data collection rate. When less clean data is recovered from the sensors, comparison of the time difference between the minimum values (−3300 and −4200) was found to give the most reliable measure of the time it took the vehicle to cut the two beams. From this the speed in this instance was calculated to be 30.37 mph at a distance of 13.5 cm from the cyclist (in this case the sensor was at the centre plane of the bike, 30 further away).

This incident (which was generated with a simple test rig, not an actual vehicle) gives a ratio of "vehicle distance (cm)/vehicle speed (mph)" of 0.44, which is a very low value (E.g. it is well below a threshold value of 1), indicating a very dangerous situation.

However it is also possible here to calculate the approximate length of the vehicle, in this example this calculation wasn't performed, but if it had been performed it would have shown that the passing object was much shorter than a car. As such the incident may be validly discarded, as the vehicles that are most dangerous to cyclists are the larger ones. In particular, when a cyclist is overtaken by another cyclist at close range this is unlikely to be as dangerous as when a car or truck overtakes in this fashion.

That said, if the incident was not disregarded due to the short vehicle length, the video data would be inspected to find licence plates, and preferably an algorithm is implemented (e.g. machine learning or video movement detection) to identify whether the vehicle with the identified number plate did in fact overtake at the time that the sensor data was recorded. Preferably the algorithm also estimates the vehicle distance in order to make sure that the sensor data could not have been caused by something else, e.g. the user's jacket or bag.

In this case, the licence plate of the overtaking vehicle is recorded, the algorithm determines that it was overtaking at the time the sensor data recorded the sudden proximity, and the speed and distance of the vehicle based on video data are compatible with that calculated from the sensor data. Accordingly the vehicle (in this case a motorbike) is identified as having overtaken dangerously, and the sensor and video data from that incident (e.g. the time duration that the sensor data recorded proximity plus 5 or 10 seconds of video data before and after) are uploaded to the server when the user returns home and the bike enters the vicinity of the user's wireless router.

Figure 12:
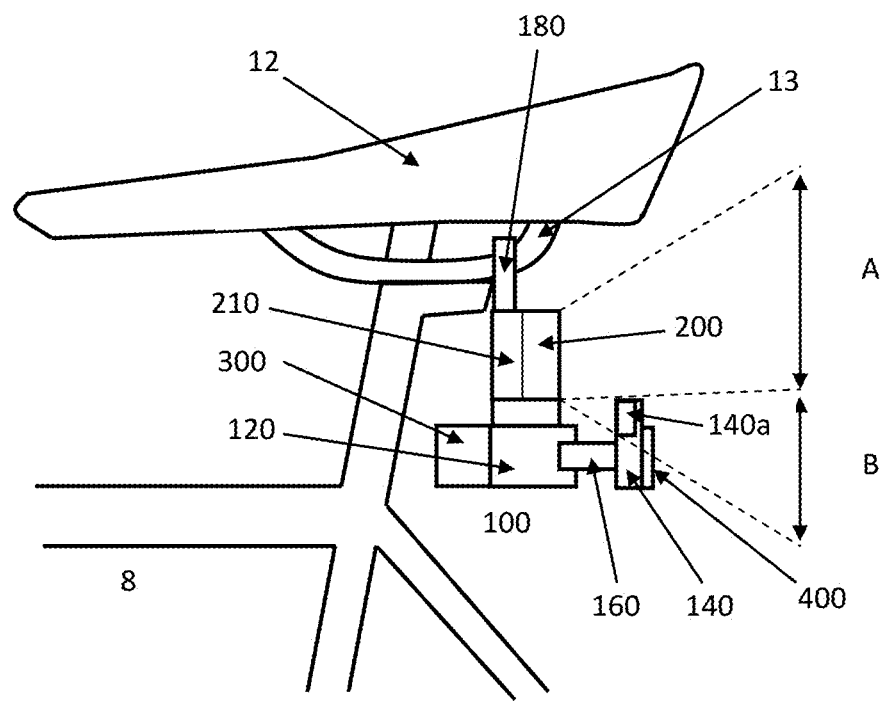
FIG. 12 is a side view of one embodiment of the accessory of the invention for providing action camera footage with vehicle proximity data, therefore encouraging safer driving.

Referring particularly to FIG. 12 which shows an embodiment of the accessory 100 of the present invention. Accessory 100 has a vehicle proximity detector 300, connected to casing 120, vehicle proximity detector 300 orientated to detect vehicle overtaking events i.e. measurements are taken substantially perpendicular to bicycle 8. Accessory 100 also has an LED display 140 with screen 140a, LED display 140 connected via arm 160 to casing 120. Casing 120 retains battery 500 (not shown). The LED display screen 140a is arranged to present vehicle proximity data, via a computer processor (retained in casing 120; also not shown) configured to: process vehicle proximity data measured by vehicle proximity detector 300; and provide for such data being displayed on LED display screen 140a in real-time.

Accessory 100 has a ring of LEDs 400 capable of displaying in a first operative mode which provides a distinctive appearance (e.g. a ring of red LEDs or other bright colour(s)) to enable approaching drivers to identify the presence of the accessory 100 on bicycle 8.

Attached to accessory 100 via action camera holder 210 is camera 200 operable to record digital video. Camera 200 is directed substantially perpendicular to the plane of the frame of bike 8 in order to capture events behind and at bike 8 (field of view represented by dotted line A), in particular vehicle overtaking manoeuvres. The orientation of LED display 140 and LED display screen 140a is such that vehicle proximity data displayed by LED display screen 140a is also captured by camera 200 during, or just after, a vehicle overtaking event (field of view represented by dotted line B). Therefore, both a vehicle overtaking event and vehicle proximity data is recorded in real time digital video by camera 200.

Accessory 100 is connected via bracket 180 to the standardised double support bars 13 of the underside of modern bike saddle 12 of bike 8.

More generally, a bicycle safety device is provided, adapted to measure how closely vehicles overtake, and sends this data along with relevant portions of video to a server for it to be used to discourage dangerous overtaking (e.g. the server may identify the relevant vehicle's licence plate number and share all of this data with vehicle insurance companies).

The bicycle safety device preferably measures both the proximity and speed of an overtaking vehicle, and calculates a driving safety assessment. This assessment, along with the video evidence, is uploaded to the server at a later time (e.g. when the cyclist returns home, the device connects to the internet via the user's wifi router).

The device may have a very distinctive light display/effect (which may double as a rear bike light) so that drivers will recognise the device and respond by only overtaking when they are able to do so safely.

To ensure that users will configure their devices to be able to upload the data, the device is preferably adapted to only display its distinctive light pattern if its wifi/internet connection has been set up successfully.

The invention claimed is:

1. A device for a bicycle for encouraging safer driving, comprising:
   an image data recorder, arranged to record image data;
   data storage;
   a camera;
   an overtaking vehicle speed detector
   a proximity detector;
   a transmission module;
   a bracket arranged for connecting the device to a bicycle in a predetermined orientation; whereby;
      a) the proximity detector measures a proximity distance of overtaking vehicles in a direction transverse to the bicycle frame;

b) the overtaking vehicle speed detector measures the speed of said overtaking vehicles in a longitudinal direction of the bike frame as it passes transverse to the bicycle frame, c) the camera is oriented to record, as said image data, images of said vehicles overtaking the bicycle in the longitudinal direction to the bike frame as they pass transverse of the bicycle frame and records a number plate of said vehicles, a computer processor with predetermined safety threshold levels inserted;

wherein the computer processor is arranged to:

d) identify, based on both the proximity distance transverse to the bike frame and overtaking vehicle speed in the substantially longitudinal direction of the bike frame, overtaking events which meet/exceed the predetermined safety threshold levels;

e) identify portions of said image data recorded at those overtaking events;

f) selectively transmit said portions of the image data to a remote server.

2. A device according to claim 1, wherein the device is configured to: preferentially store in the data storage any image data in relation to cases where the vehicle overtaking events meet the predetermined safety threshold levels and the data storage will delete or overwrite from the data storage any other image data from the image data recorder.

3. A device according to claim 1, wherein the proximity detector comprises an ultrasonic sensor.

4. A device according to claim 1, wherein the overtaking vehicle speed detector determines said vehicle speed in the longitudinal plane of the bicycle frame in a first direction, and said proximity sensor determines distance in a second direction that is substantially transverse to the first direction, and wherein the computer processor identifies the predetermined safety threshold levels as being met only where relative motion of a vehicle in the first and second direction meets or exceeds the predetermined safety threshold levels.

5. A device according to claim 1, wherein the device comprises:

the overtaking vehicle speed detector determines vehicle proximity to the longitudinal plane of a bicycle frame that also generates vehicle overtaking speed data; and the transmission module is arranged to transmit to the remote server the vehicle overtaking speed data when it exceeds the predetermined safety thresholds.

6. A device according to claim 5 wherein the overtaking vehicle speed detector is provided by a camera arranged to generate the vehicle overtaking speed data by identifying the relative speed of motion in one or parts of the field of view.

7. A device according to claim 5, wherein the computer processor is arranged to:

process the vehicle proximity distance data, and the vehicle overtaking speed data to identify vehicle overtaking manoeuvres, and for each vehicle overtaking manoeuvre generate a) an assessment of the safety of that vehicle overtaking manoeuvre, and b) determine whether the safety of that vehicle overtaking manoeuvre was below the predetermined safety thresholds;

identify image data from the image data recorder, that is relevant to each vehicle overtaking manoeuvre which was below the predetermined safety threshold levels;

and the transmission module is arranged to transmit, for at least those manoeuvres for which the safety assessment was below the predetermined safety threshold levels, a) the vehicle overtaking manoeuvre safety assessment; and b) the image data relevant to that overtaking manoeuvre.

8. A device according to claim 1, comprising a light in the form of at least one light emitting diode for providing a bicycle light.

9. A device according to claim 1, wherein the device comprises said bracket for connection to the bicycle frame or a bicycle seat, the bracket being arranged to lock onto a variety of tubular metal bicycle components and wherein the bracket is provided with a press-release connection to a device housing, such that upon the press-release connection being pressed, the device housing can be removed from the bracket and from the bicycle.

10. A device according to claim 1, wherein: the device is further provided with a bicycle speed sensor adapted to determine either the speed of a bicycle on which the device is mounted, or the radial speed of a wheel thereof, and to generate bicycle speed data therefrom; and the device is arranged either: a) to transmit such bicycle speed data to the remote server to enable the server to calculate the absolute speed of overtaking vehicles; or b)to calculate the absolute speed of overtaking vehicles by deducting the bicycle speed from the relative overtaking velocity of the vehicles.

11. A device according to claim 1, wherein the transmission module comprises a wireless data transmission module, and the device is configured to authenticate with a wireless router in the event that the device is brought within wireless transmission range thereof, and to transmit the data to the remote server via the wireless router, and upon completion of the transmission to either delete such data or mark it as transmitted and wherein the device is configured such that if it is brought into wireless transmission range with a wireless router with which it has previously authenticated, it will automatically authenticate without requiring user intervention and automatically transmit such aforementioned data to the remote server.

12. A device according to claim 1, comprising:

a display comprising a light; and wherein:

the computer processor is arranged to control the device in either of two modes:

a first operative mode in which the device records the image data and vehicle proximity data in such a manner that would cause it to be transmitted to the remote server when possible;

a second non-cooperative mode in which the device does not record the image data and vehicle proximity data in such a manner that would cause it to be transmitted to the remote server when possible;

and the computer processor preferentially operates in the first operative mode, but operates instead in the second non-cooperative mode in the event that a predetermined data criterion is satisfied, the predetermined data criterion relating to at least one of a)an amount of available space in the data storage device is below a threshold level; and/or, b) a predetermined duration has elapsed since a last occasion on which the device uploaded data to the remote server, based on a clock and a recording by the device of such last occasion;

and the computer processor is arranged to control the display to indicate the status of the predetermined data criterion.

13. The device according to claim 1, wherein:

the device comprises a button; and the computer processor is arranged to respond to an actuation of the button by marking the most recent image data and vehicle proximity data as relating to an event of interest such that this data is not deleted.

14. The device of claim 1 where the computer processor controls the transmission module to selectively transmit the image data recorded at the time of said overtaking event to the remote server and also transmits the recorded number plate.

15. The device of claim 1 further comprising a second camera facing forward.

* * * * *